(12) United States Patent
Ely

(10) Patent No.: US 8,570,028 B2
(45) Date of Patent: Oct. 29, 2013

(54) TRANSDUCER FOR A POSITION SENSOR

(75) Inventor: David Thomas Eliot Ely, Cambridge (GB)

(73) Assignee: Cambridge Integrated Circuits Limited, Cambridge, Cambridgeshire (GB)

( * ) Notice: Subject to any disclaimer, the term of this patent is extended or adjusted under 35 U.S.C. 154(b) by 317 days.

(21) Appl. No.: 12/599,287

(22) PCT Filed: Apr. 28, 2008

(86) PCT No.: PCT/GB2008/050305
§ 371 (c)(1),
(2), (4) Date: Oct. 19, 2010

(87) PCT Pub. No.: WO2008/139216
PCT Pub. Date: Nov. 20, 2008

(65) Prior Publication Data
US 2012/0098527 A1    Apr. 26, 2012

(30) Foreign Application Priority Data
May 10, 2007    (GB) .................................. 0708981.6
Jul. 18, 2007    (GB) .................................. 0713942.1

(51) Int. Cl.
*G01B 7/14* (2006.01)
(52) U.S. Cl.
USPC ............ 324/207.15; 324/207.11; 324/207.12; 324/207.13; 324/207.16; 324/207.25
(58) Field of Classification Search
USPC .............. 324/207.15, 207.11–207.16, 207.25
See application file for complete search history.

(56) References Cited

U.S. PATENT DOCUMENTS

| | | | |
|---|---|---|---|
| 2,145,742 | A | 1/1939 | Wechsung |
| 2,867,783 | A | 1/1959 | Childs |

(Continued)

FOREIGN PATENT DOCUMENTS

| | | |
|---|---|---|
| DE | 1 134 848 | 8/1962 |
| DE | 35 00 121 | 7/1986 |

(Continued)

OTHER PUBLICATIONS

Patents Act 1977: Search Report under Section 17 for GB 0416614.6, 1 pg., (Oct. 21, 2004).

(Continued)

*Primary Examiner* — Huy Q Phan
*Assistant Examiner* — Adam Clarke
(74) *Attorney, Agent, or Firm* — Blakely, Sokoloff, Taylor & Zafman LLP

(57) ABSTRACT

A transducer has a magnetic field concentrating member a first coil to couple with a first portion of the magnetic field concentrating member positioned adjacent the first coil and a second coil to couple with a second portion of the magnetic field concentrating member positioned adjacent the second coil, the second portion being spaced along the magnetic field concentrating member from the first portion. The transducer comprises a resonator having a coil wound around a portion of said magnetic field concentrating member which is located between said first and second portions. The transducer is arranged so that the electromagnetic coupling between the resonator and at least one of the first and second coils varies as a function of the relative position between the elongate field concentrating member and that coil. In this way, separate processing electronics can process the signals obtained from the transducer to determine the desired position information.

20 Claims, 18 Drawing Sheets

(56) References Cited

U.S. PATENT DOCUMENTS

| | | | |
|---|---|---|---|
| 2,942,212 A | 6/1960 | Mynall | |
| 3,219,956 A | 11/1965 | Newell et al. | |
| 3,297,940 A | 1/1967 | Mulligan et al. | |
| 3,482,242 A | 12/1969 | Hargrove | |
| 3,579,023 A | 5/1971 | Fox | |
| 3,647,963 A | 3/1972 | Bailey | |
| 3,772,587 A | 11/1973 | Farrand et al. | |
| 3,812,481 A | 5/1974 | Stedtnitz | |
| 3,851,242 A | 11/1974 | Ellis | |
| 3,873,770 A | 3/1975 | Ioannou | |
| 3,895,356 A | 7/1975 | Kraus | |
| 3,898,635 A | 8/1975 | Kulterman | |
| 3,906,436 A | 9/1975 | Kurauchi et al. | |
| 3,925,610 A | 12/1975 | French et al. | |
| 3,962,663 A | 6/1976 | Visser | |
| 4,005,396 A | 1/1977 | Fujiwara et al. | |
| 4,014,015 A | 3/1977 | Gundlach | |
| 4,065,850 A | 1/1978 | Burr et al. | |
| 4,081,603 A | 3/1978 | Davis et al. | |
| 4,092,852 A | 6/1978 | Fowler et al. | |
| 4,094,572 A | 6/1978 | Burr et al. | |
| 4,097,684 A | 6/1978 | Burr | |
| 4,150,352 A | 4/1979 | Pomella et al. | |
| 4,156,192 A | 5/1979 | Schedrovitsky et al. | |
| 4,205,199 A | 5/1980 | Mochizuki | |
| 4,210,775 A | 7/1980 | Rodgers et al. | |
| 4,223,300 A | 9/1980 | Wiklund | |
| 4,255,617 A | 3/1981 | Carau, Sr. et al. | |
| 4,341,385 A | 7/1982 | Doyle et al. | |
| 4,358,723 A | 11/1982 | Scholl et al. | |
| 4,387,509 A | 6/1983 | Dechelette | |
| 4,423,286 A | 12/1983 | Bergeron | |
| 4,425,511 A | 1/1984 | Brosh | |
| 4,482,784 A | 11/1984 | Whetstone | |
| 4,504,832 A | 3/1985 | Conte | |
| 4,507,638 A | 3/1985 | Brosh | |
| 4,532,376 A | 7/1985 | Rockwell | |
| 4,577,057 A | 3/1986 | Blesser | |
| 4,577,058 A | 3/1986 | Collins | |
| 4,593,245 A | 6/1986 | Viertl et al. | |
| 4,609,776 A | 9/1986 | Murakami et al. | |
| 4,642,321 A | 2/1987 | Schoenberg et al. | |
| 4,672,154 A | 6/1987 | Rodgers et al. | |
| 4,686,501 A | 8/1987 | Palmier et al. | |
| 4,693,778 A | 9/1987 | Swiggett et al. | |
| 4,697,050 A | 9/1987 | Farel et al. | |
| 4,697,144 A | 9/1987 | Howbrook | |
| 4,697,244 A | 9/1987 | Murakami et al. | |
| 4,704,501 A | 11/1987 | Taguchi et al. | |
| 4,709,209 A | 11/1987 | Murakami et al. | |
| 4,711,026 A | 12/1987 | Swiggett et al. | |
| 4,711,977 A | 12/1987 | Miyamori et al. | |
| 4,723,446 A | 2/1988 | Saito et al. | |
| 4,734,546 A | 3/1988 | Landmeier | |
| 4,737,698 A | 4/1988 | McMullin et al. | |
| 4,748,295 A | 5/1988 | Rogers | |
| 4,752,655 A | 6/1988 | Tajiri et al. | |
| 4,786,765 A | 11/1988 | Yamanami et al. | |
| 4,820,961 A | 4/1989 | McMullin | |
| 4,821,002 A | 4/1989 | Luly | |
| 4,848,496 A | 7/1989 | Murakami et al. | |
| 4,868,443 A | 9/1989 | Rossi | |
| 4,878,553 A | 11/1989 | Yamanami et al. | |
| 4,891,590 A | 1/1990 | Hammel et al. | |
| 4,893,077 A | 1/1990 | Auchterlonie | |
| 4,902,858 A | 2/1990 | Yamanami et al. | |
| 4,963,703 A | 10/1990 | Phillips et al. | |
| 4,975,546 A | 12/1990 | Craig | |
| 4,985,691 A | 1/1991 | Pulyer et al. | |
| 4,988,837 A | 1/1991 | Murakami et al. | |
| 4,999,461 A | 3/1991 | Murakami et al. | |
| 5,004,872 A | 4/1991 | Lasley | |
| 5,013,047 A | 5/1991 | Schwab | |
| 5,023,408 A | 6/1991 | Murakami et al. | |
| 5,028,745 A | 7/1991 | Yamanami et al. | |
| 5,041,785 A | 8/1991 | Bogaerts et al. | |
| 5,045,645 A | 9/1991 | Hoendervoogt et al. | |
| 5,059,180 A | 10/1991 | McLees | |
| 5,066,833 A | 11/1991 | Zalenski | |
| 5,082,286 A | 1/1992 | Ryan et al. | |
| 5,088,928 A | 2/1992 | Chan | |
| 5,122,623 A | 6/1992 | Zank et al. | |
| 5,129,654 A | 7/1992 | Bogner | |
| 5,134,388 A | 7/1992 | Murakami et al. | |
| 5,134,689 A | 7/1992 | Murakami et al. | |
| 5,136,125 A | 8/1992 | Russell | |
| 5,177,389 A | 1/1993 | Schalk | |
| 5,188,368 A | 2/1993 | Ryan | |
| 5,206,785 A | 4/1993 | Hukashima | |
| 5,218,174 A | 6/1993 | Gray et al. | |
| 5,225,637 A | 7/1993 | Rodgers et al. | |
| 5,239,489 A | 8/1993 | Russell | |
| 5,245,336 A | 9/1993 | Chen et al. | |
| 5,247,137 A | 9/1993 | Epperson | |
| 5,247,138 A | 9/1993 | Landmeier | |
| 5,274,198 A | 12/1993 | Landmeier | |
| 5,342,136 A | 8/1994 | Fukami | |
| 5,349,139 A | 9/1994 | Verrier et al. | |
| 5,357,062 A | 10/1994 | Rockwell et al. | |
| 5,369,227 A | 11/1994 | Stone | |
| 5,381,091 A | 1/1995 | Kobayashi et al. | |
| 5,396,443 A | 3/1995 | Mese et al. | |
| 5,406,155 A | 4/1995 | Persson | |
| 5,434,372 A | 7/1995 | Lin | |
| 5,461,204 A | 10/1995 | Makinwa et al. | |
| 5,486,731 A | 1/1996 | Masaki et al. | |
| 5,525,981 A | 6/1996 | Abernethy | |
| 5,554,827 A | 9/1996 | Oda | |
| 5,557,076 A | 9/1996 | Wieczorek et al. | |
| 5,571,997 A | 11/1996 | Gray et al. | |
| 5,600,105 A | 2/1997 | Fukuzaki et al. | |
| 5,619,431 A | 4/1997 | Oda | |
| 5,625,239 A | 4/1997 | Persson et al. | |
| 5,635,683 A | 6/1997 | McDermott et al. | |
| 5,646,496 A | 7/1997 | Woodland et al. | |
| 5,657,011 A | 8/1997 | Komatsu et al. | |
| 5,691,513 A | 11/1997 | Yamamoto et al. | |
| 5,691,748 A | 11/1997 | Fukuzaki | |
| 5,693,913 A | 12/1997 | Sudo et al. | |
| 5,693,993 A | 12/1997 | Ito et al. | |
| 5,748,110 A | 5/1998 | Sekizawa et al. | |
| 5,751,229 A | 5/1998 | Funahashi | |
| 5,764,052 A * | 6/1998 | Renger | 324/258 |
| 5,783,940 A | 7/1998 | Kolomeitsev | |
| 5,815,091 A * | 9/1998 | Dames et al. | 340/870.34 |
| 5,818,091 A | 10/1998 | Lee et al. | |
| 5,818,431 A | 10/1998 | Oh et al. | |
| 5,826,473 A | 10/1998 | Saka et al. | |
| 5,831,431 A * | 11/1998 | Gottfried-Gottfried et al. | 324/239 |
| 5,854,449 A | 12/1998 | Adkins | |
| 5,864,098 A | 1/1999 | Shinohe | |
| 5,866,847 A | 2/1999 | Saka et al. | |
| 5,895,895 A | 4/1999 | Ono et al. | |
| 5,914,735 A | 6/1999 | Yamamoto et al. | |
| 5,939,878 A * | 8/1999 | Dong | 324/207.17 |
| 5,943,044 A | 8/1999 | Martinelli et al. | |
| 6,002,387 A | 12/1999 | Ronkka et al. | |
| 6,005,555 A | 12/1999 | Katsurahira et al. | |
| 6,054,851 A * | 4/2000 | Masreliez et al. | 324/207.17 |
| 6,124,708 A | 9/2000 | Dames | |
| 6,131,457 A * | 10/2000 | Sato | 73/514.31 |
| 6,236,199 B1 | 5/2001 | Irle et al. | |
| 6,239,789 B1 | 5/2001 | Sekizawa et al. | |
| 6,249,135 B1 | 6/2001 | Maruyama et al. | |
| 6,249,234 B1 | 6/2001 | Ely et al. | |
| 6,249,235 B1 | 6/2001 | Iwasaki | |
| 6,255,810 B1 | 7/2001 | Irle et al. | |
| 6,262,684 B1 | 7/2001 | Stewart et al. | |
| 6,271,744 B1 * | 8/2001 | McCarthy | 338/32 H |
| 6,288,710 B1 | 9/2001 | Lee et al. | |
| 6,291,907 B1 * | 9/2001 | Haigh et al. | 307/91 |
| 6,304,014 B1 | 10/2001 | England et al. | |
| 6,304,076 B1 | 10/2001 | Madni et al. | |

(56) References Cited

U.S. PATENT DOCUMENTS

| | | | |
|---|---|---|---|
| 6,310,473 B1 * | 10/2001 | Zhao | 324/207.25 |
| 6,393,912 B2 * | 5/2002 | Pchelnikov et al. | 73/488 |
| 6,489,899 B1 | 12/2002 | Ely et al. | |
| 6,513,943 B2 | 2/2003 | Fukuyoshi | |
| 6,522,128 B1 * | 2/2003 | Ely et al. | 324/207.17 |
| 6,534,970 B1 * | 3/2003 | Ely et al. | 324/207.17 |
| 6,650,106 B2 * | 11/2003 | Daalmans et al. | 324/164 |
| 6,667,740 B2 | 12/2003 | Ely et al. | |
| 6,705,511 B1 | 3/2004 | Dames et al. | |
| 6,713,981 B2 * | 3/2004 | Nakajima | 318/491 |
| 6,788,221 B1 | 9/2004 | Ely et al. | |
| 6,797,895 B2 | 9/2004 | Lapstun et al. | |
| 6,798,404 B2 | 9/2004 | Sharma | |
| 6,888,538 B2 | 5/2005 | Ely et al. | |
| 6,909,281 B2 * | 6/2005 | Gassman et al. | 324/207.24 |
| 6,969,987 B2 * | 11/2005 | Schwartzbart | 324/174 |
| 6,977,594 B2 * | 12/2005 | Hudman et al. | 340/686.1 |
| 6,980,134 B2 | 12/2005 | Ely et al. | |
| 7,005,847 B2 * | 2/2006 | Gassman et al. | 324/207.25 |
| 7,019,672 B2 * | 3/2006 | Ely | 341/20 |
| 7,219,547 B2 * | 5/2007 | Suzuki | 73/504.04 |
| 7,301,333 B2 * | 11/2007 | Kuwahara | 324/207.25 |
| 7,305,882 B1 * | 12/2007 | May | 73/514.31 |
| 7,511,705 B2 * | 3/2009 | Silk et al. | 345/179 |
| 8,058,865 B2 * | 11/2011 | May | 324/207.16 |
| 2001/0001430 A1 | 5/2001 | Ely et al. | |
| 2001/0006369 A1 | 7/2001 | Ely | |
| 2001/0045858 A1 | 11/2001 | Alhoussami | |
| 2001/0052823 A1 | 12/2001 | Hirano et al. | |
| 2002/0163331 A1 * | 11/2002 | Sekiya et al. | 324/225 |
| 2002/0179339 A1 | 12/2002 | Ely et al. | |
| 2003/0006760 A1 * | 1/2003 | Valles | 324/207.15 |
| 2003/0062889 A1 | 4/2003 | Ely et al. | |
| 2004/0035221 A1 * | 2/2004 | May | 73/862.331 |
| 2004/0169594 A1 | 9/2004 | Ely et al. | |
| 2004/0232913 A1 * | 11/2004 | Schott et al. | 324/253 |
| 2004/0233178 A1 | 11/2004 | Silk et al. | |
| 2005/0021269 A1 | 1/2005 | Ely et al. | |
| 2005/0171714 A1 | 8/2005 | Ely et al. | |
| 2005/0174259 A1 | 8/2005 | Ely | |
| 2006/0244464 A1 * | 11/2006 | Kreit | 324/654 |
| 2009/0102463 A1 * | 4/2009 | May | 324/207.16 |
| 2009/0237073 A1 * | 9/2009 | Uchiyama et al. | 324/207.11 |
| 2010/0301840 A1 * | 12/2010 | Filatov | 324/207.11 |
| 2011/0043196 A1 * | 2/2011 | Fujita et al. | 324/207.16 |
| 2011/0109304 A1 * | 5/2011 | Suzuki et al. | 324/207.25 |
| 2013/0113467 A1 * | 5/2013 | Sasada | 324/207.15 |

FOREIGN PATENT DOCUMENTS

| | | |
|---|---|---|
| DE | 36 20 412 | 12/1987 |
| EP | 0 159 191 A2 | 10/1985 |
| EP | 0 182 085 A2 | 5/1986 |
| EP | 0 182 085 A3 | 5/1986 |
| EP | 0 209 513 A1 | 1/1987 |
| EP | 0 218 745 A1 | 4/1987 |
| EP | 0 307 667 A2 | 3/1989 |
| EP | 0 313 046 A1 | 4/1989 |
| EP | 0 499 641 A1 | 8/1992 |
| EP | 0 511 406 A1 | 11/1992 |
| EP | 0 537 458 A1 | 4/1993 |
| EP | 0 552 001 A1 | 7/1993 |
| EP | 0 554 900 A1 | 8/1993 |
| EP | 0 607 694 A1 | 7/1994 |
| EP | 0 657 917 A1 | 6/1995 |
| EP | 0 672 997 A2 | 9/1995 |
| EP | 0 675 581 A1 | 10/1995 |
| EP | 0 680 009 A2 | 11/1995 |
| EP | 0 709 648 A2 | 5/1996 |
| EP | 0 716 390 A1 | 6/1996 |
| EP | 0 743 508 A1 | 11/1996 |
| EP | 0 772 149 A1 | 5/1997 |
| EP | 0 915 429 A2 | 5/1999 |
| FR | 1 325 017 | 4/1963 |
| FR | 2 298 082 | 8/1976 |
| FR | 2 682 760 | 4/1993 |
| GB | 851 543 | 10/1960 |
| GB | 1 122 763 | 8/1968 |
| GB | 1 452 132 | 10/1976 |
| GB | 2 012 431 | 7/1979 |
| GB | 2 021 273 | 11/1979 |
| GB | 2 042 183 | 9/1980 |
| GB | 2 059 593 | 4/1981 |
| GB | 2 064 125 | 6/1981 |
| GB | 2 074 736 | 11/1981 |
| GB | 1 604 824 | 12/1981 |
| GB | 2 103 943 | 3/1983 |
| GB | 2 141 235 | 12/1984 |
| GB | 2231161 A * | 11/1990 |
| JP | 60-165512 | 8/1985 |
| JP | 60-189231 | 9/1985 |
| JP | 63-211014 | 9/1988 |
| JP | 02-248816 | 10/1990 |
| JP | 02-275314 | 11/1990 |
| JP | 60-51905 | 2/1994 |
| TW | 287267 | 10/1996 |
| TW | 347542 | 12/1998 |
| WO | WO 92/12401 | 7/1992 |
| WO | WO 94/25829 | 11/1994 |
| WO | WO 9425829 A1 * | 11/1994 |
| WO | WO 95/31696 | 11/1995 |
| WO | WO 96/03188 | 2/1996 |
| WO | WO 97/14935 | 4/1997 |
| WO | WO 98/00921 | 1/1998 |
| WO | WO 98/54545 | 12/1998 |
| WO | WO 98/58237 | 12/1998 |
| WO | WO 99/19691 | 4/1999 |
| WO | WO 99/34171 | 7/1999 |
| WO | WO 99/61868 | 12/1999 |
| WO | WO 00/33244 | 6/2000 |

OTHER PUBLICATIONS

PCT International Search Report for PCT/GB2004/003639, 2 pgs., (Apr. 11, 2005).

PCT International Search Report for PCT/GB1999/003989, 5 pgs., (Aug. 23, 2000).

PCT International Search Report for PCT/GB2003/002432, 3 pgs., (May 11, 2004).

PCT International Search Report for PCT/GB2002/005247, 5 pgs., (May 23, 2005).

PCT International Search Report for PCT/GB2002/002387, 5 pgs., (Jan. 8, 2004).

Pulle, et al., "A New Magnetoresistive Based Sensor for Switched Reluctance Drives", Proceedings of the Annual Power Electronics Specialists Conference, PESC '92 Record., vol. 2, No. 23, 23$^{rd}$ Annual IEEE, pp. 839-843, (Jun. 29-Jul. 3, 1992).

Gordon, "Digitial xy Position Indicator using Walsh Functions", Electronics Letters, vol. 11, No. 1, pp. 5-6, (Jan. 9, 1975).

Patents Act 1977: Examination Report under Section 18(3) for GB 0422091.9, 4 pgs., (Jun. 1, 2005).

PCT Notification of Transmittal of International Search Report and Written Opinion for PCT Counterpart Application No. PCT/GB2008/050305 containing Communication relating to the Results of the Partial International Search Report, 13 pgs., (Feb. 12, 2009).

D. McDonnell, "The Use of Inductosyn to Digital Converters in Linear Control Systems", Automation, vol. 10, No. 11-12, pp. 31-32, (Nov./Dec. 1975), XP-002077774.

Robert W. Klatt, "Phase of Digital Fixes Shaft Angle", Electrical Design News, vol. 16, No. 12, pp. 53-56, (Jun. 15, 1971), XP002045871.

"Physics 2CL Lab Manual" Online! 1999, retrieved from the Internet on May 11, 2005: http://hep.ucsd.edu/dbmacf/1998-1999/2cl/manual/experiment3.pdf, pp. 51-61, XP00232778.

\* cited by examiner

TRANSDUCER FOR A POSITION SENSOR

CROSS-REFERENCE TO RELATED APPLICATIONS

This patent application is a U.S. National Phase application under 35 U.S.C. 371 of International Application No. PCT/GB2008/050305, filed on Apr. 28, 2008, entitled TRANSDUCER, which claims priority to Great Britain patent application number 0708981.6, filed May 10, 2007, and Great Britain patent application number 0713942.1, filed Jul. 18, 2007.

FIELD

The present invention relates to a transducer for use in an inductive position sensor. The invention has particular relevance to transducers for linear and rotary position sensor systems which are applicable to machines, robotics, front panel controls and instrumentation, and other applications where such position measurements are required.

BACKGROUND

Various electromagnetic transducers have been proposed for use in sensing position. A traditional approach is the use of optical encoders. However these devices are expensive and prone to dirt contamination unless housed, at added cost. More recently Hall-effect based sensors have become available, dedicated to the task of absolute position sensing. These are exemplified by Austria Microsystems' AS5030 integrated circuit, which measures the angular position of a magnet positioned above. However these sensors are relatively sensitive to DC magnetic fields present in their operating environment, for example due to their proximity to motors and/or the presence of magnets. They are also sensitive to misalignment of the magnet's rotation axis relative to their own central axis, which can cause errors in their reported position. Such misalignment arises through tolerances at manufacture. It is possible to calibrate out the resulting errors, but the resulting calibration time is costly. It is possible to mechanically trim out the misalignment, but the trimming step is costly. It is possible to tighten the tolerances, but this usually results in the need for more expensive components.

Inductive sensors such as those described in U.S. Pat. No. 6,522,128 (the contents of which are incorporated herein by reference) overcome the problem of DC magnetic field sensitivity by operating with AC fields. Many of these known inductive sensors use excitation and sensor coils that are inductively coupled, in use, to a resonator coil. To keep manufacturing costs down, the coils, including the resonator coil, are manufactured from conductive tracks mounted on printed circuit boards. This can result in relatively low Q factor and hence poor signal levels and hence poor signal to noise for a given drive power.

SUMMARY

The present invention aims to provide an alternative transducer design that can be used in an electromagnetic position sensor.

According to one aspect, the present invention provides a transducer for use in a position sensor, the transducer comprising: a magnetic field concentrating member; a first coil operable, in use, to couple with a first portion of the magnetic field concentrating member positioned adjacent the first coil; a second coil operable, in use, to couple with a second portion of the magnetic field concentrating member positioned adjacent the second coil, the second portion being spaced along the magnetic field concentrating member from the first portion; and a resonator having a coil wound around a portion of said magnetic field concentrating member which is located between said first and second portions; wherein, during use, the electromagnetic coupling between the resonator coil and at least one of the first and second coils varies as a function of the relative position between the resonator and that coil. In this way, separate processing electronics can process the signals obtained from the transducer to determine the desired position information.

The electromagnetic coupling between the resonator and both the first and second coils varies as a function of the relative position between the resonator and those coils.

A third coil may be provided for coupling with a third portion of the elongate magnetic field concentrating member positioned adjacent the third coil, the first portion being positioned between said second and third portions. In this case, the second and third coils can be connected in series, preferably so that signals induced in the second coil by a background magnetic field oppose the signals induced in the third coil by the same background magnetic field.

The arrangement of the resonator and the coils is preferably such that, during use, an electromagnetic field generated by the resonator couples with a first polarity with the second coil and couples with a second, opposite, polarity with the third coil.

In one embodiment, the field concentrating member is rotatable about an axis which passes through or near said first portion and the resonator coil is mounted asymmetrically on the field concentrating member. In this case, the second and third coils can be symmetrically arranged about an axis which is substantially coaxial with the rotational axis of the field concentrating member.

In a preferred embodiment, the first and second coils are substantially planar and the magnetic field concentrating member is oriented so that a longitudinal axis of the magnetic field concentrating member lies in a plane that is substantially parallel with said planar coils. The planar coils can be formed, for example, from conductor tracks on a printed circuit board or from conductive inks on a substrate.

Another aspect provides a rotational position sensor comprising a resonant element mounted for relative rotational motion about an axis of rotation and which is operable to generate substantially equal and opposite magnetic fields on opposing sides of said axis of rotation in response to a substantially rotationally symmetric excitation magnetic field.

The resonant element may be formed from an inductor and capacitor or from a mechanical type resonator such as a magnetostrictive element. If formed from an inductor and capacitor, the inductor may include a coil wound onto a permeable member, such as a ferrite rod. In one embodiment, the coil is asymmetrically positioned on the ferrite rod relative to the rotation axis of the resonant element.

If required, the permeable member may be tilted relative to substantially planar sensor coils to ensure that the field magnitudes are equalised on opposing sides of the rotational axis.

This aspect also provides a system for inductively measuring the angular position of the above resonant element. The system may include one or more patterned sensor coils for the detection of resonator angle. The patterning of the sensor coils may be arranged to generate a substantially sinusoidally varying amplitude with angle in response to resonator rotation.

The system may include a processor for combining coupling information from multiple sensor coils to deliver a position indication substantially immune to misalignment of the resonator and sensor coils.

The system may include a substantially rotationally symmetric coil for powering the resonator. Alternatively, the resonator may be powered from the patterned coils.

BRIEF DESCRIPTION OF THE DRAWINGS

These and various other aspects of the invention will become apparent from the following detailed description of exemplary embodiment described with reference to the accompanying drawings in which.

DETAILED DESCRIPTION

Overview

Figure 1:
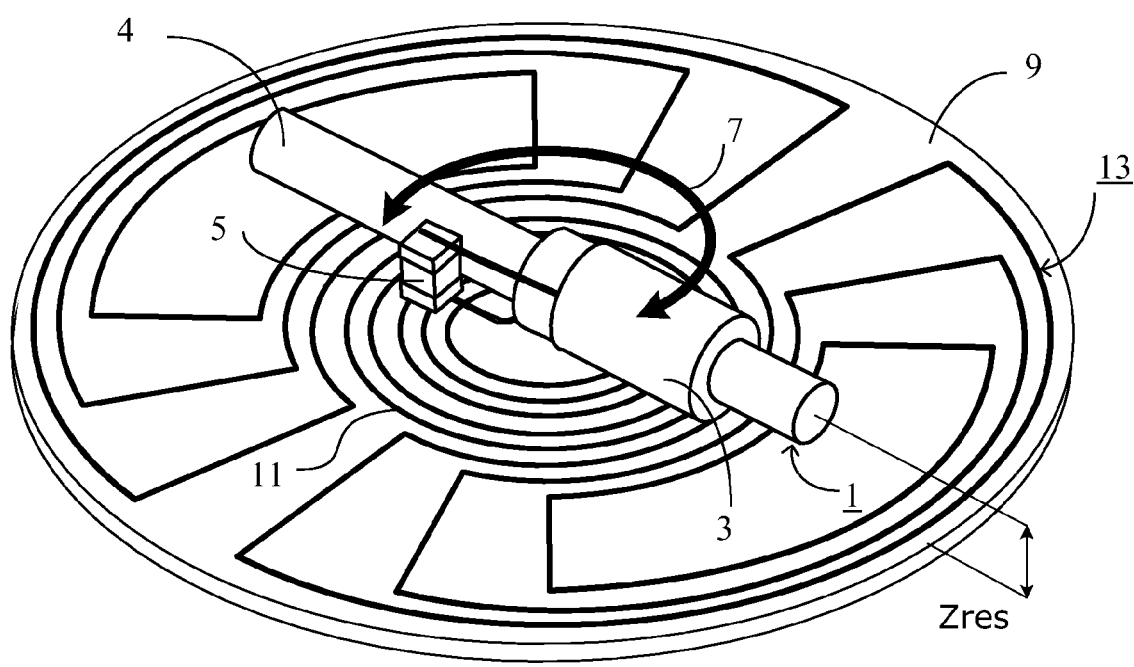
FIG. 1 is a schematic illustration of a rotary position sensor for determining the angular position of a rotor relative to stator.

One embodiment of the invention is illustrated in FIG. 1. A resonator 1 is built from a coil 3 wound around a ferrite rod 4, with the ends of the coil 3 being connected in parallel with a capacitor 5 to form an LC resonant circuit. As shown, the resonator coil 3 is mounted asymmetrically along the length of the ferrite rod 4. The length of the ferrite rod 4 is approximately 20 mm with a diameter of about 2 mm and the outer diameter of the resonator coil 3 is about 3 mm. The use of a relatively long thin field concentrating member (ferrite rod 4) wound with a coil 3 of relatively small diameter means that the resonator 1 has a very high Q-factor. The resonator 1 is mounted for angular motion (represented by arrow 7) relative to a sensor circuit board 9, such that the axis of the coil 3 is substantially parallel with the plane of the circuit board 9. The axis of rotation of the resonator 1 is the centre of the ferrite rod 4, which is nominally aligned with the centre of the sensor board 9. The resonator 1 may, for example, be mounted on a rotor of a motor and the sensor board 9 may be mounted on the stator.

The resonator 1 is powered by an excitation coil 11 integrated onto the sensor board 9. This excitation coil 11 generates an approximately uniform and rotationally symmetric field concentrated near the centre of the resonator's ferrite rod 4. The excitation field is concentrated by the ferrite rod 4. The asymmetric placement of the resonator coil 3 on the ferrite rod 4 means that it couples with the resulting concentrated field. The coupling factor is largely immune to the rotational angle of the resonator 1, due to the radially symmetric nature of the excitation field. The resonator 1 is therefore forced to resonate at all angular positions Az, and with a phase relationship to the excitation field which is largely independent of that angle.

Once powered to resonance by the excitation field, the resonator 1 generates its own AC magnetic fields in response. This field passes along the ferrite rod 4, such that the field at the end of the rod furthest from the coil 3 ("long end") is approximately equal and opposite to the field at the end closest to the coil 3 ("short end"). This resonator field couples into sensor coils 13 located adjacent the ends of the ferrite rod 4. In this embodiment, the sensor coils 13 are patterned so that the coupling of this resonator field with the sensor coils 13 varies with the angular position of the resonator 1 relative to the sensor coils 13.

This resonator 1 can be used in conjunction with a wide range of sensor coil 13 geometries. The fact that the fields from its two ends have opposite polarity mean that there is no rotational symmetry so that it is possible for sensing electronics to determine the resonator's angular position unambiguously over 360°. The fact that these fields are approximately equal in strength and opposite in polarity means that the sensor can be highly immune to misalignments between the resonator 1 and the sensor circuit board 9, provided that the sensor coils 13 used have equal and opposite sensitivity to the individual misalignment of field from the long and short ends of the ferrite rod 4.

Figure 2A:
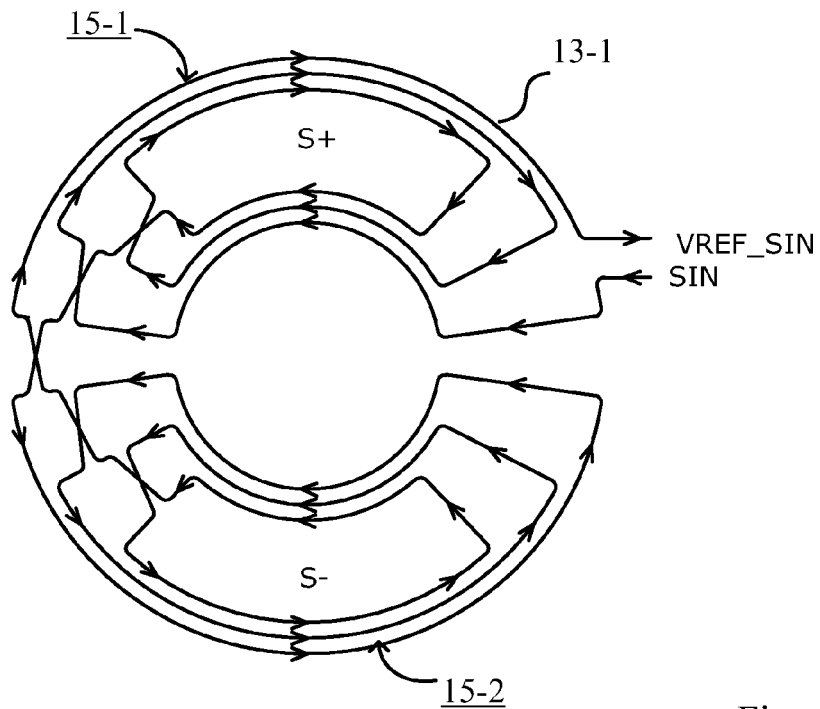
FIG. 2a schematically illustrates a SIN sensor winding used in the position sensor shown in FIG. 1.
Figure 2B:
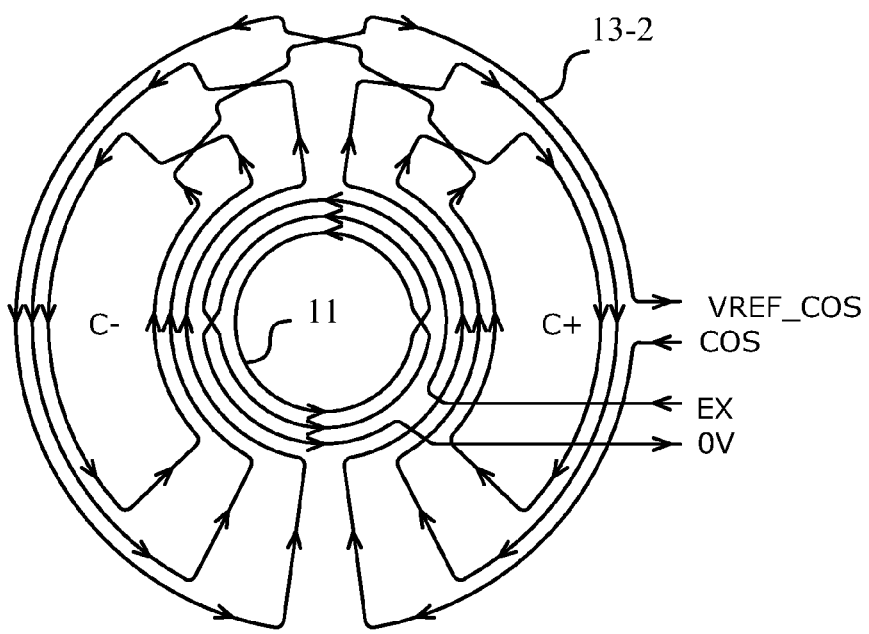
FIG. 2b schematically illustrates a COS sensor winding and an excitation winding used in the position sensor shown in FIG. 1.

One possible sensor coil geometry is illustrated in FIG. 2a, which shows a one period "SIN" sensor coil 13-1. As shown, the SIN coil 13-1 is formed from two sets of conductor loops 15-1 and 15-2, which are connected in series but wound in the opposite sense. FIG. 2b illustrates the excitation coil 11 and a one period "COS" sensor coil 13-2, which is similar to the SIN sensor coil 13-1 except rotated by 90°. Each sensor coil 13 has equal and opposite sensitivity to fields at opposing points equidistant from the sensor's central axis. This is because of the two sets of loops 15 of each sensor winding 13 are connected in series so that they are wound in the opposite direction. In the following description, one set of loops will be referred to as the S+ or C+ set of loops and the other will be referred to as the S− or C− set of loops and these are illustrated in FIG. 2. This means that the field from the long end of the resonator of FIG. 1 will couple in the same sense into each sensor coil 13 as field from its short end.

The SIN coil 13-1 is shown separately for clarity, but its centre actually coincides with the centres of the COS coil 13-2 and the excitation coil 11. For clarity the number of turns in each coil has been simplified: the number of turns in each coil is larger in the actual pattern, and cross connections are less pronounced.

Operation

Figure 3:
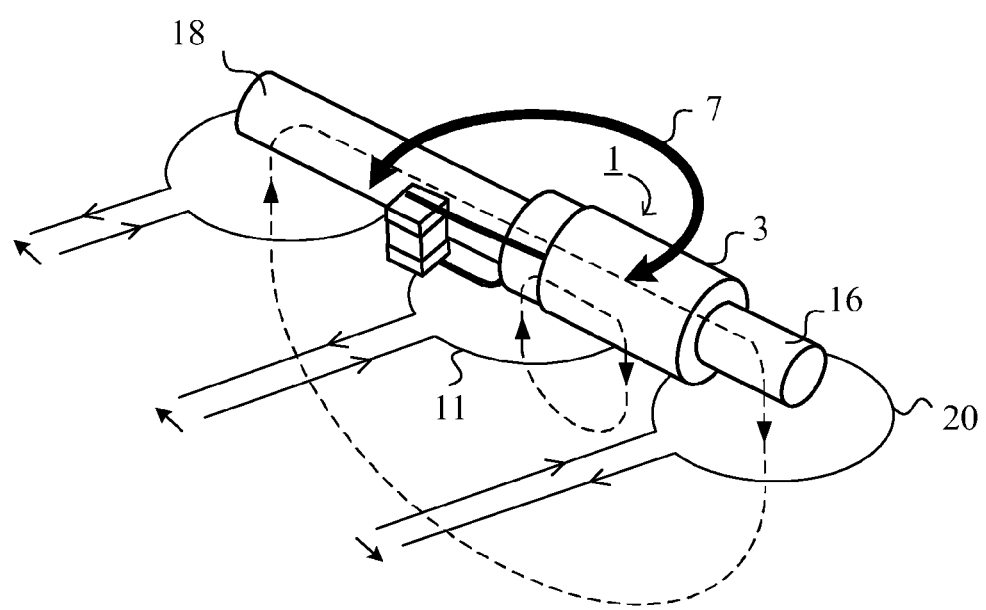
FIG. 3 schematically illustrates the magnetic interaction between a resonator mounted on the rotor and an excitation winding and sensor winding mounted on the stator.

The operation of the sensor will now be described with reference to FIG. 3, which shows the resonator 1, a simplified representation of the excitation coil 11 and two test coils 18-1 and 18-2 positioned either side of the excitation coil 11. The sensor's excitation coil 11 is located close to the axis of rotation of the ferrite rod 4. Since the resonator's coil 3 is offset from this axis of rotation, there is a constant coupling between the excitation coil 11 and the resonator 1 independent of resonator angle. When the resonator 1 is resonating, the AC field generated by the resonator 1 approximates that of a bar magnet. Field emerges from the short end 16 of the resonator and "flows" to the long end 18. Since the field is AC, it can be detected by measuring the EMF developed in coils which couple with the field. Test coils 20 placed under the short and long ends of the resonator in the plane of the sensor board 9, would detect equal and opposite EMFs. In reality there are no such test coils 20, instead the resonator 1 interacts with the COS and SIN coils 13 illustrated above.

Figure 4:
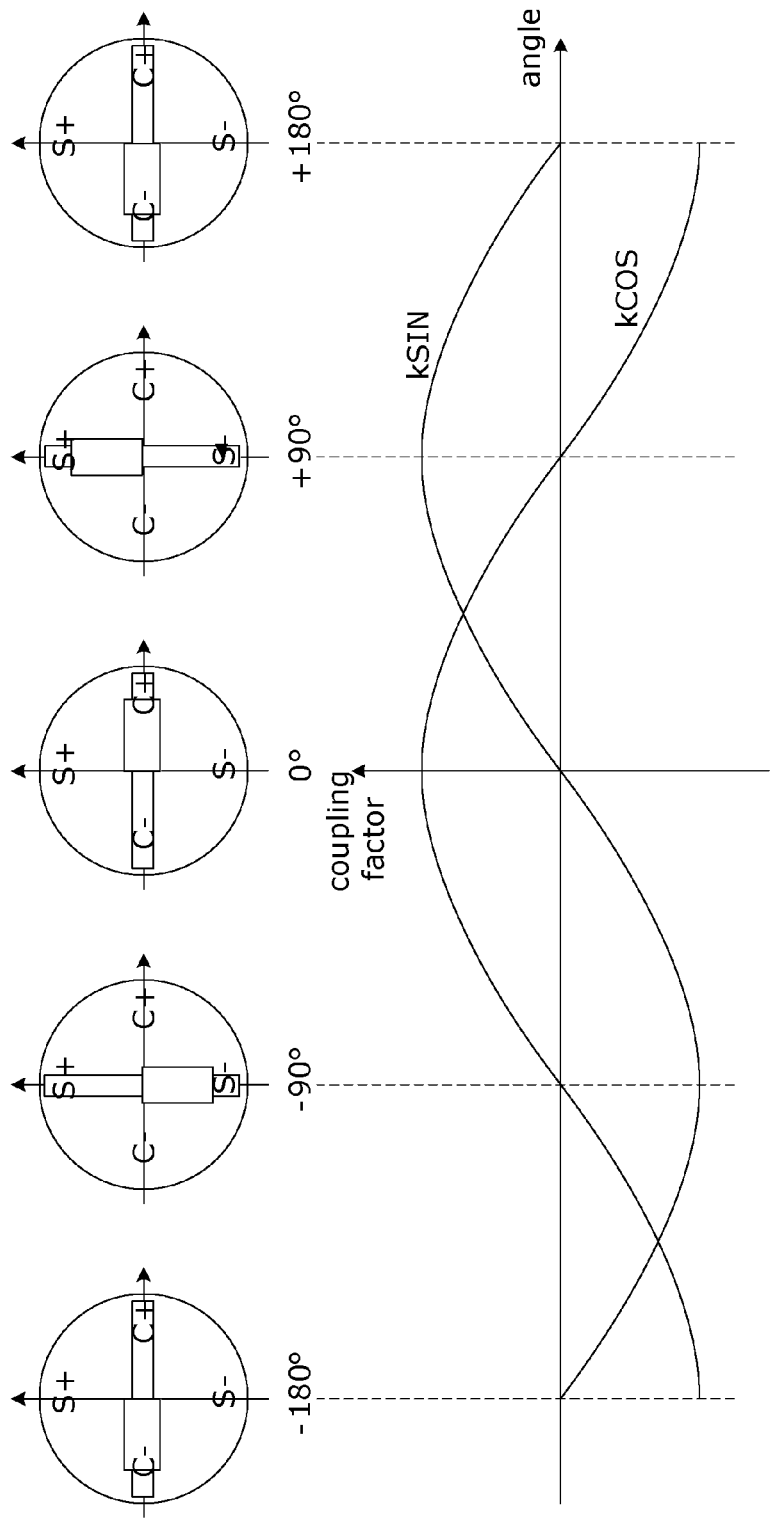
FIG. 4 schematically illustrates the way in which the signals obtained from the SIN and COS sensor winding varies with the rotation angle of the resonator.

When the resonator 1 is aligned at 0° so that its short end 16 is centered on C+ (the positive set of loops of the COS coil 13-2 illustrated in FIG. 2*b*), it couples in the positive direction with the COS coil 13-2. This situation is illustrated at the centre of FIG. 4. At the same time, the long end 18 of the resonator 1 is aligned with the C− set of loops of the COS coil 13-2, whose winding direction is opposite to the C+ set of loops. This end also couples positively with the COS coil 13-2, since the field direction at the long end 18 of the ferrite rod 4 is opposite to that at the short end 16. The net effect is a large positive coupling between the resonator 1 and the COS coil 13-2 (kCOS). The coupling between the resonator 1 and SIN coil 13-1 (kSIN) is zero at 0°, because any EMF developed by the resonator in the S+ set of loops is connected in series with an equal and opposite EMF developed in the S− set of loops.

The situation is reversed at −180° (which is identical to +180° in this case). Here the short end 16 of the resonator 1 and the C+ set of loops of the COS coil 13-2 coincide, and the long end 18 and the C− set of loops of the COS coil 13-2 coincide. kCOS is therefore now a large negative value. kSIN remains zero.

At 90° the short end 16 of the resonator 1 coincides with the S+ set of loops and the long end 18 with the S− set of loops. kSIN is therefore a large positive value, and KCOS is zero.

The graph in FIG. 4 illustrates the full relationship between the two sensor coil coupling factors and resonator angle. As shown, kSIN has a sinusoidal form, and kCOS its cosine counterpart. As those skilled in the art will appreciate, although the geometry of the sensor coils 13 are designed so that these coupling factors will vary in a substantially sinusoidal manner, in practice they will not vary exactly sinusoidally. However, this will simply introduce a slight error into the measurements.

Misalignment Immunity

Figure 5A:
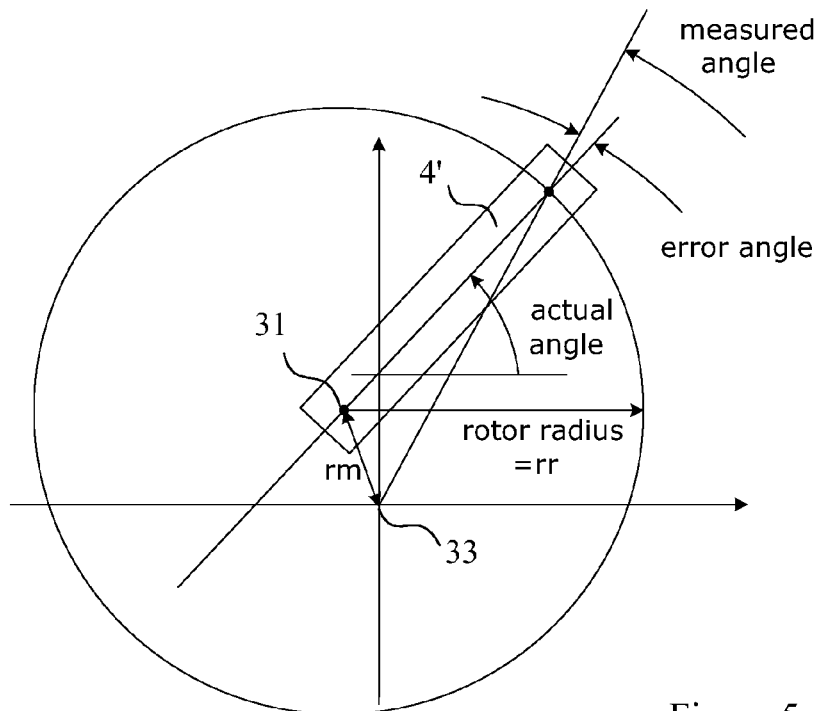
FIG. 5a schematically illustrates an error in reported position caused by an offset between a resonator and the excitation and sensor windings.
Figure 5B:
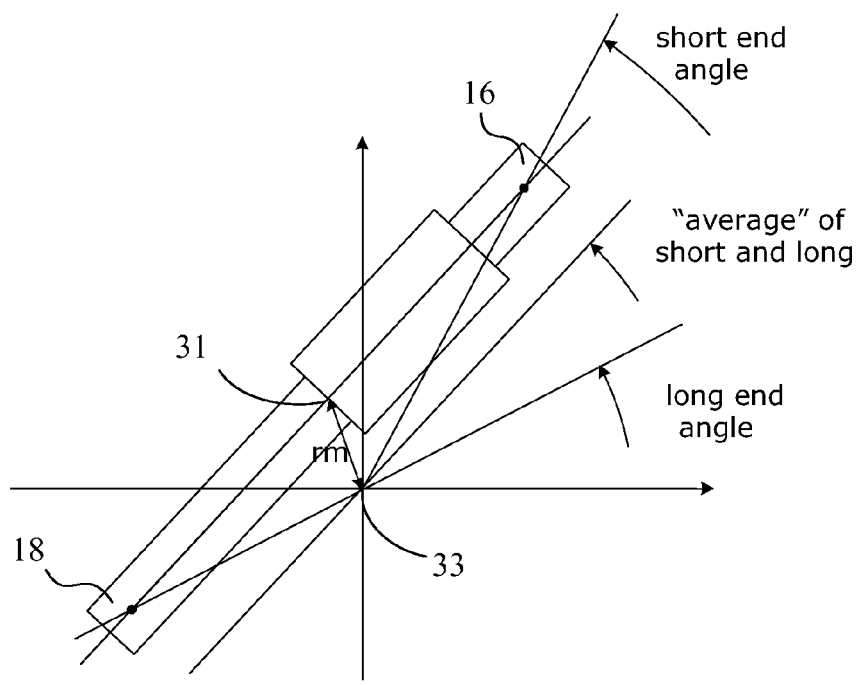
FIG. 5b schematically illustrates how the offset shown in FIG. 5a is overcome using the resonator design shown in FIG. 1.

We will now consider the effect of a misalignment (Mx) in the x-direction and (My) in the y-direction for the resonator 1 shown in FIG. 1 and for an alternative design of resonator, where a shorter ferrite rod 4' is used and the resonator is symmetrically positioned along the length of the ferrite rod 4'. These misalignments in the x and y directions are illustrated in FIGS. 5*a* and 5*b* by the vector rm. With the resonator design shown in FIG. 5*a*, the misalignment (rm) between the resonator's axis of rotation 31 and the sensor board axis 33 will result in an error in the measured angle. However, with the resonator design shown in FIG. 1, this measurement error will, to a first approximation, average out due to the interaction between the opposite ends of the resonator 1 with the different sets of loops forming the sensor coils 13.

The reason for this will now be explained. A processing circuit (not shown) connected to the sensor coils 13 determines position from the relative amplitude of the signals (Acos and Asin) detected in the COS and SIN sensor coils 13 respectively:

$$Az\_estimate = a\tan 2(A\cos, A\sin)$$

The signals induced in the sensor coils 13 will be AC signals at the excitation frequency. The processing circuit will therefore process these signals to determine their relative amplitudes so that they can be used in the above 4 quadrant arctangent calculation.

If we now consider the detected signals as being obtained by two components—one for the field due to the long end of the resonator 1 and one due to the field from the short end of the resonator 1, then:

$$Az\_estimate = a\tan 2(A\cos\_short + A\cos\_long, A\sin\_short + A\sin\_long)$$

Provided the magnitude of the vector rm is small (ie the misalignments in the x and y directions are small) enough that detected signals from the short and long ends of the resonator 1 remain approximately the same, then this can be approximated by:

$$Az\_estimate = 0.5 \times [a\tan 2(A\cos\_short, A\sin\_short) + a\tan 2(A\cos\_long, A\sin\_long)]$$

Denoting:

$$Az\_estimate\_short = a\tan 2(A\cos\_short, A\sin\_short)$$

$$Az\_estimate\_long = a\tan 2(A\cos\_long, A\sin\_long)$$

which are the effective angular positions of the resonator's short and long ends (which the system can not individually detect since the underlying signals are summed together by virtue of the series connection of the sets of loops 15 forming the sensing coils 13), then we can then write:

$$Az\_estimate = 0.5 \times [Az\_estimate\_short + Az\_estimate\_long]$$

Thus the system's reported position is the average of the effective angular position of the resonator's short and long ends. By symmetry, if misalignments Mx and My cause an angular error of Az_error_short in Az_estimate_short, then an equal and opposite angular error Az_error_long=−Az_error_short will be caused in Az_estimate_long. The net effect on the value of Az_estimate reported by the system will therefore be zero, yielding a system that is largely immune to misalignments.

Sensor Board Design

In this embodiment, the sensor coils 13 and the excitation coil 11 are formed from conductor tracks formed on a four layer printed circuit board 9. FIGS. 6*a* to 6*d* illustrate the conductors on the four layers which, when connected together at the illustrated via holes, form the above described COS sensor coil 13-2; FIGS. 7*a* to 7*d* illustrate some of the conductor tracks that define the above described excitation winding 11; and FIGS. 8*a* to 8*d* illustrate the four layers of conductor tracks (showing all tracks).

Figure 6A:
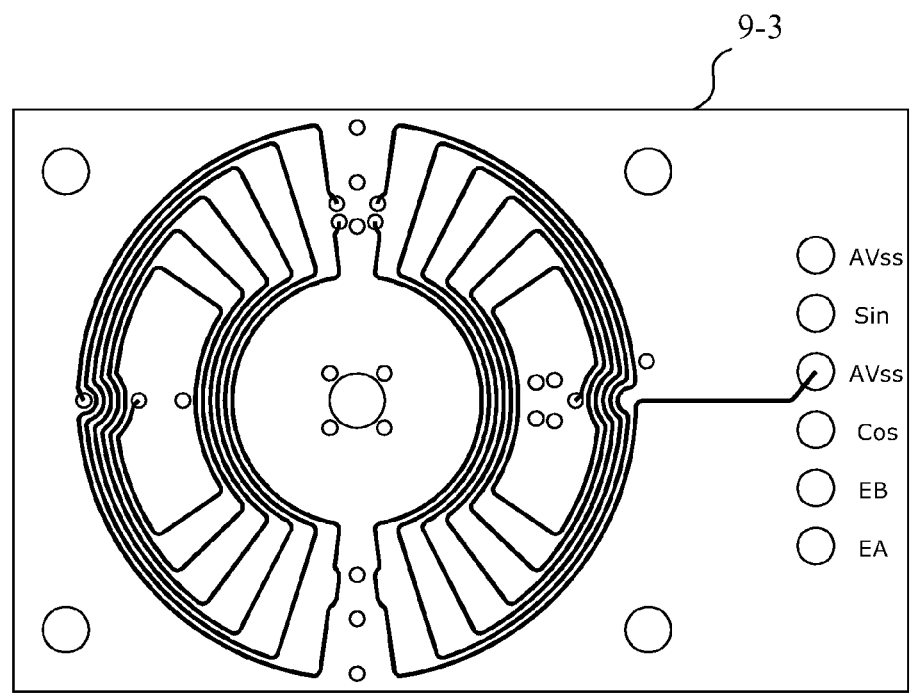
FIGS. 6a to 6d illustrate the conductive tracks formed on the four layers of the sensor board which form the COS sensor winding.
Figure 6B:
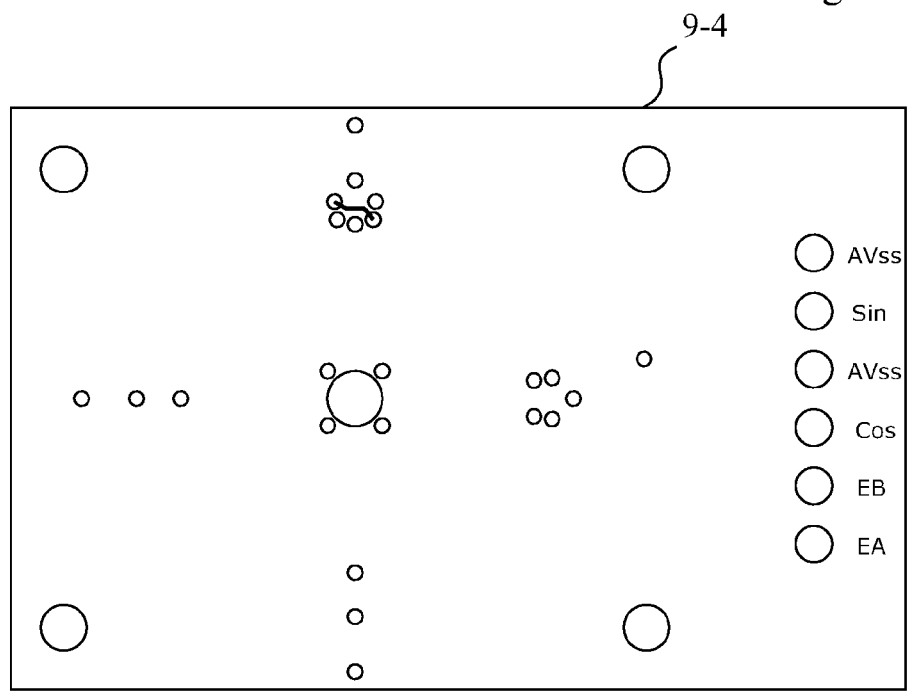
Figure 6C:
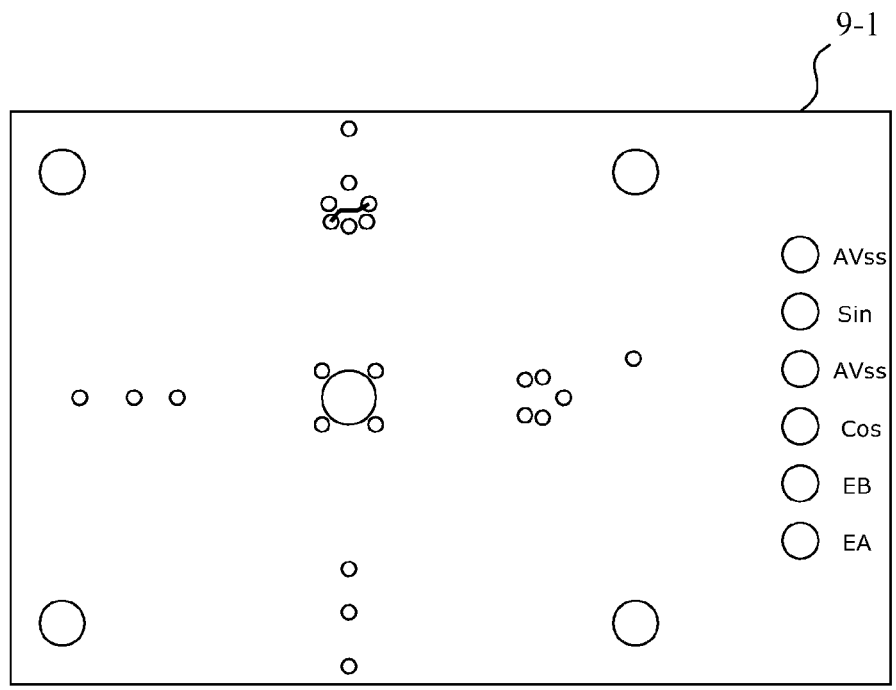
Figure 6D:
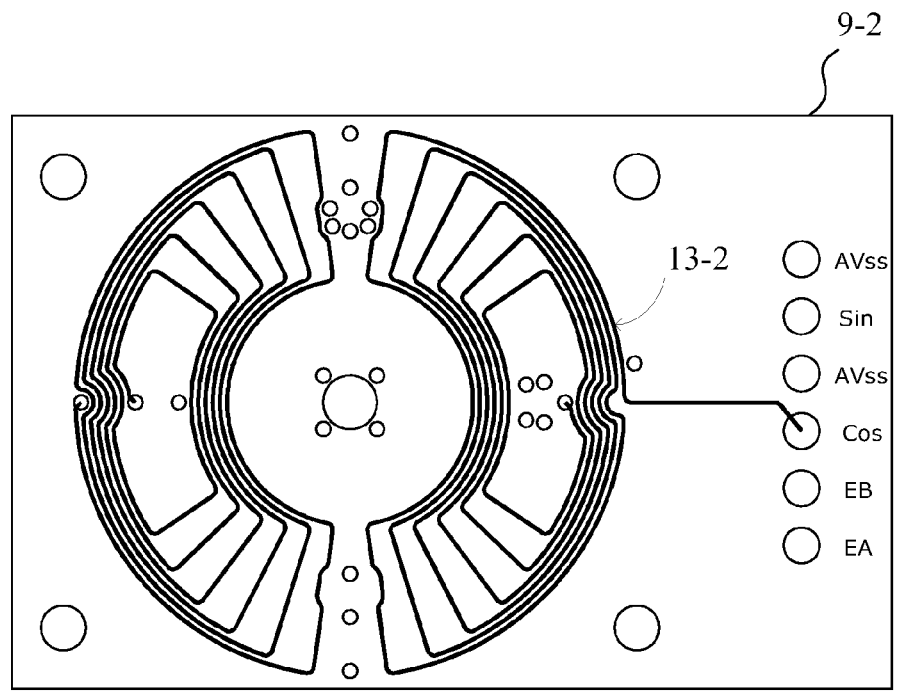

FIG. 6*a* illustrates a portion of the COS coil 13-2 described above, implemented on layer 1 of the 4 layer PCB 9. FIG. 6*b* illustrates another small portion of the COS coil 13-2—a small trace connecting two vias at the top centre of the board 9 implemented on layer 2 of the PCB 9. FIG. 6c illustrates another small trace connecting two vias at the top centre of the board, implemented on layer 3 of the PCB 9. FIG. 6d illustrates the remainder of the COS coil 13-2, implemented on layer 4 of the PCB 9. The COS coil portions on layers 1 and 4 have a large number of coil turns—6 each in this case, yielding a total of 12 turns. This contrasts with some prior art approaches, where it is not possible to fit more than about 3 turns in the same diameter operating to the same design rules. These design rules include he minimum gap between conductors on the same layer and the minimum diameter for the vias.

The two small traces illustrated in FIGS. 6b and 6c are used to connect the two halves of the COS coil 13-2, and to ensure that the winding direction of the left and right hand set of loops 15 are opposite, as required.

Each main sensing set of loops of the COS coil 13-2 comprises a set of turns on layer 1 (here illustrated in FIG. 6a) and another set on layer 4 (shown in FIG. 6d). The loops on each of these layers are almost exact mirror images of each other, with a horizontal axis of symmetry passing through the centre of the patterns. This symmetry improves the symmetry of the relationship between resonator angle and output signal, to improve accuracy.

The two sets of loops are connected by only a few vias. The use of such a small number of vias means that a maximum amount of space can be afforded to conductor traces, and hence a maximum number of turns. This is especially important in the design presented here, since it is implemented on four layers. Each via therefore occupies space not only on the layers it is connecting, but also on the layers occupied by other traces to which appropriate clearance is required.

The SIN coil 13-1 is almost identical to the COS coil 13-2, only rotated through 90° and implemented mainly on layers 2 and 3. FIGS. 8a to 8d show all four layers of the PCB 9 separately, and illustrate how the SIN, COS and excitation coils, and their respective cross connections and vias, fit together without clashing. Once again it is important that the COS coil 13-2 be almost identical to the SIN coil 13-1, for symmetry reasons that yield greatest accuracy.

As shown, the SIN and COS coils 13 are largely implemented on different layers of the PCB 9. The problem of different sensing amplitudes is solved by having the SIN and COS coils 13 each implemented on multiple layers, such that their mean depth within the PCB stack-up is nominally identical.

Figure 7A:
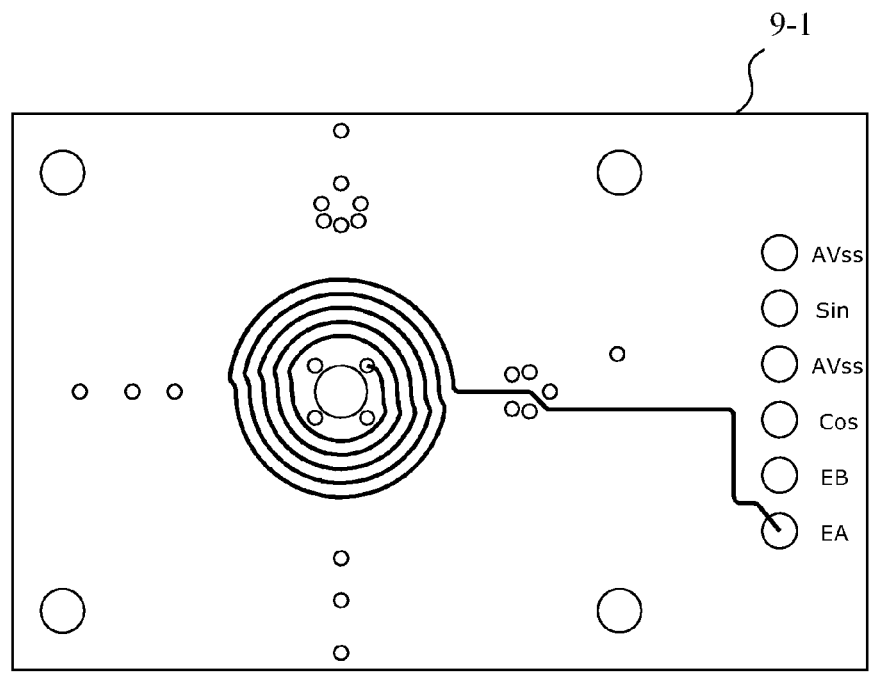
FIGS. 7a to 7d illustrate the conductive tracks formed on the four layers of the sensor board which form part of the excitation winding.
Figure 7B:
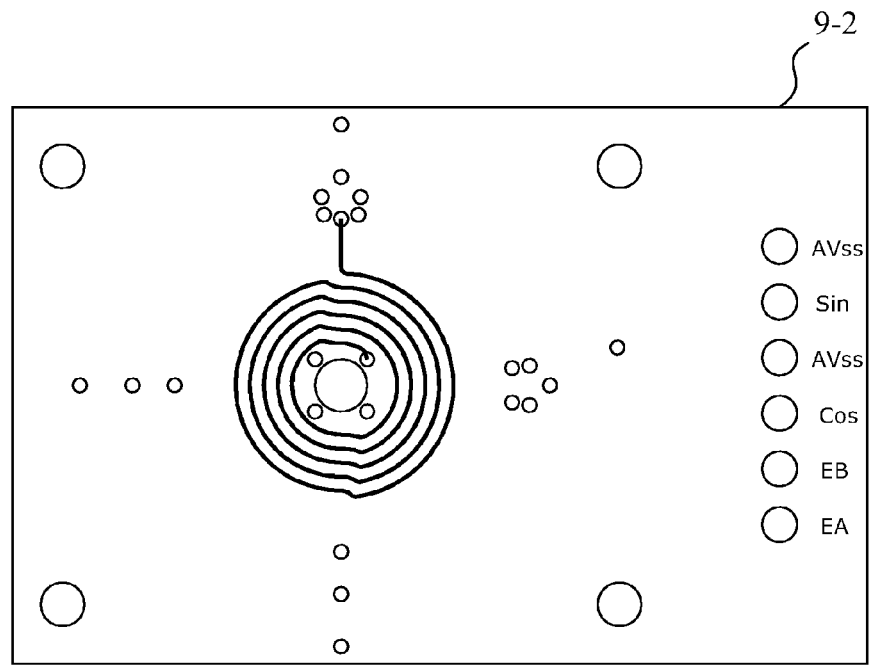
Figure 7C:
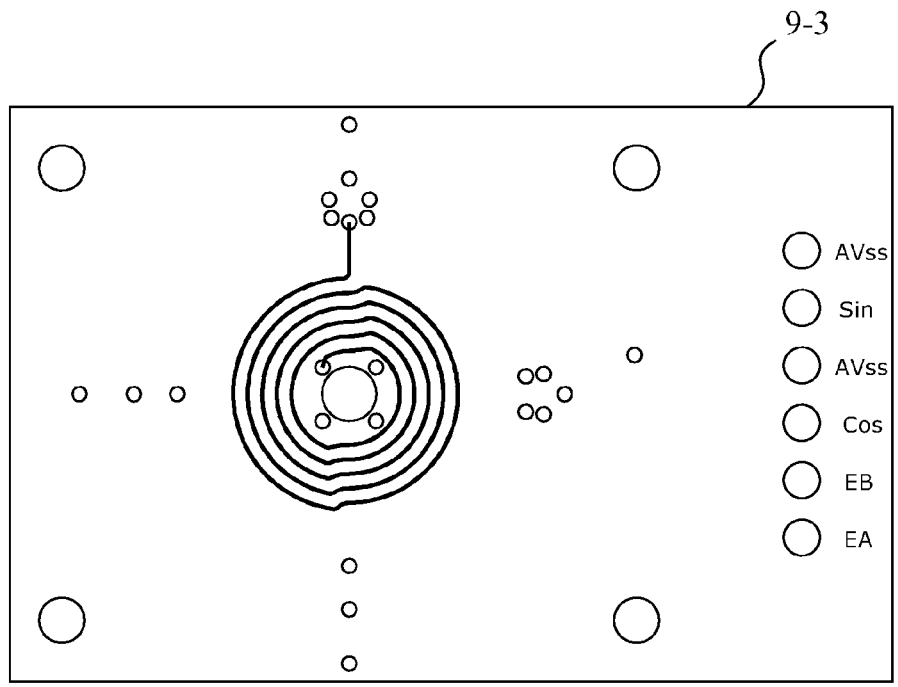
Figure 7D:
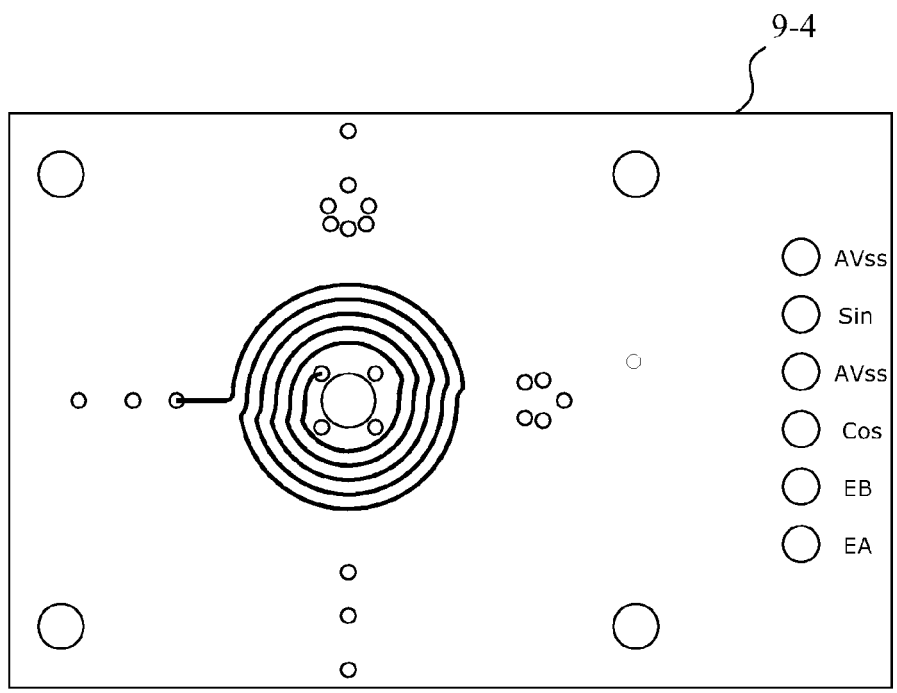
Figure 8A:
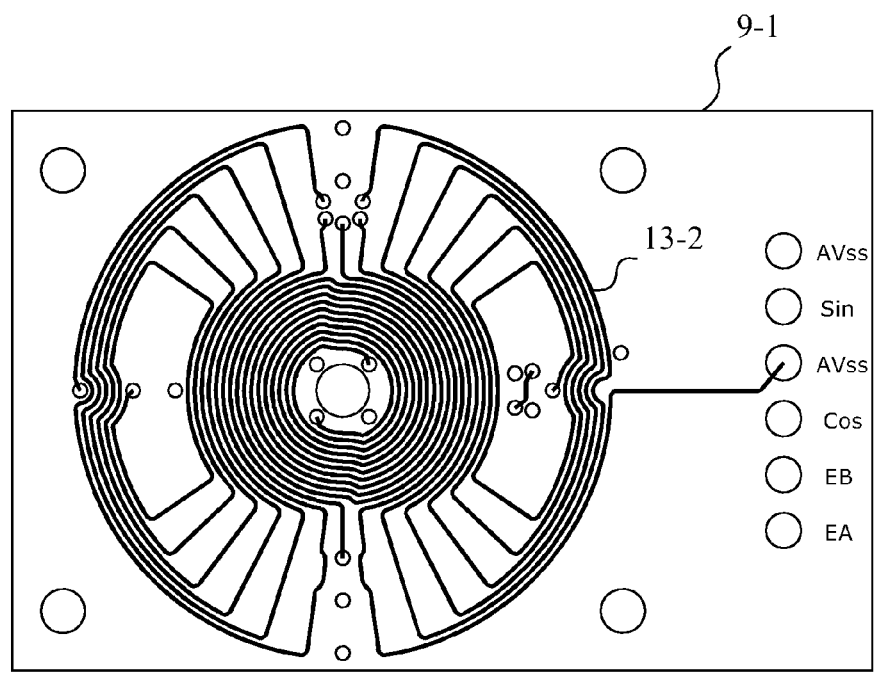
FIGS. 8a to 8d illustrate all of the conductive tracks on the four layers of the sensor printed circuit board.
Figure 8B:
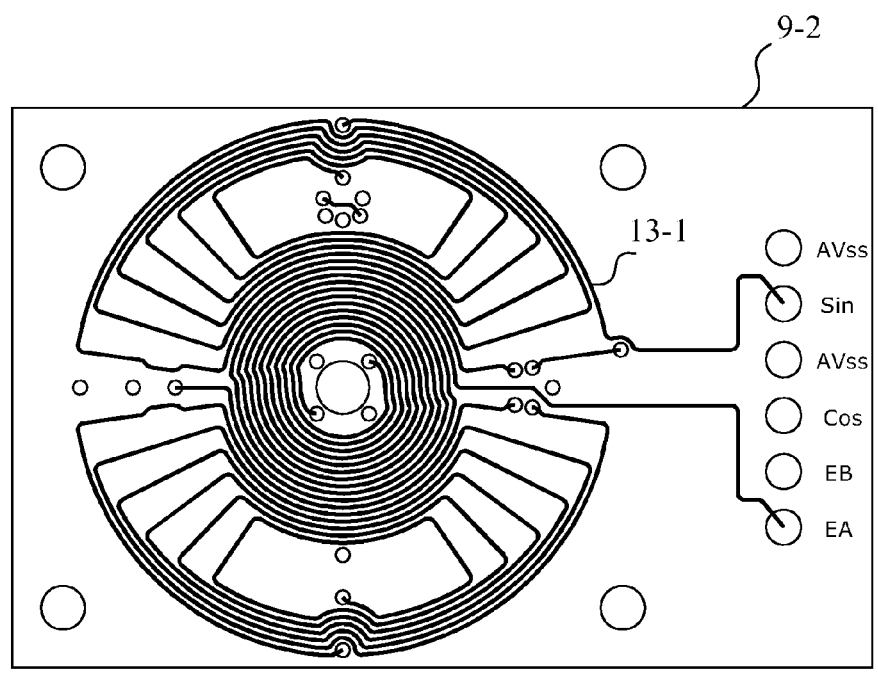
Figure 8C:
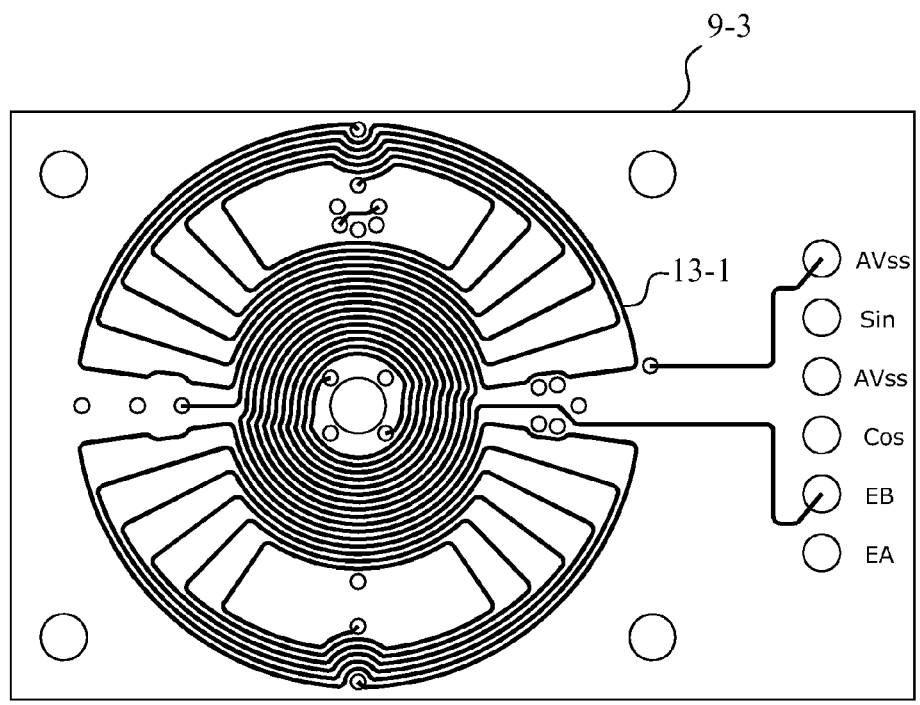
Figure 8D:
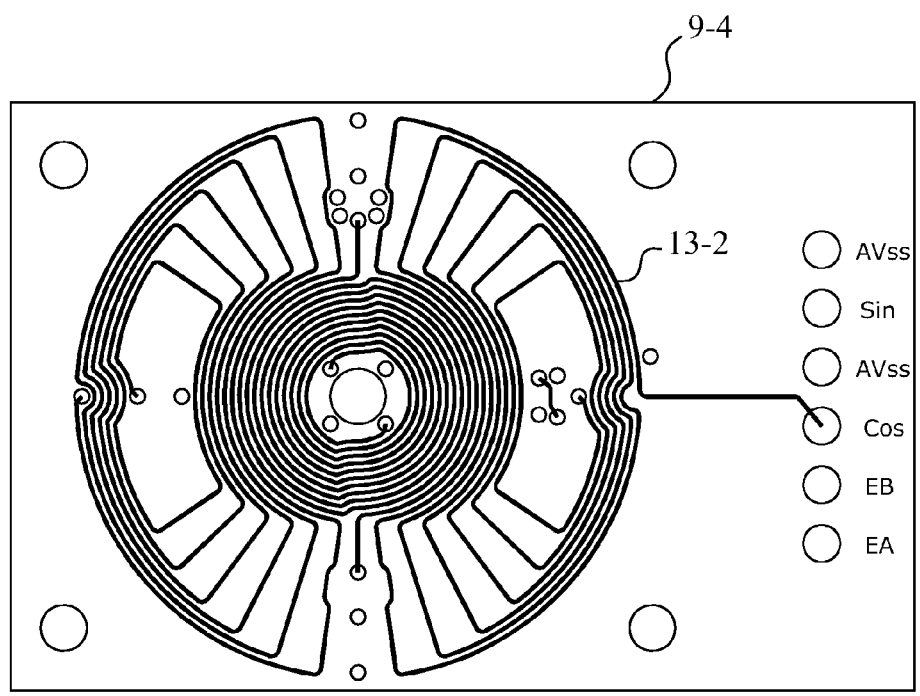

The excitation coil 11 is concentrated towards the centre of the board 9. FIG. 7a illustrates a first section of the sensor board's excitation coil 11, extending from the EA connection at the right of the board to a via at the top right of the coil's interior. A second section is illustrated in FIG. 7b, extending from that via to another above the excitation coil 11. A third section is illustrated in FIG. 7c, extending from that via to another at the top left of the coil's interior. A fourth section is illustrated in FIG. 7d, extending from that via to another to the left of the excitation coil 11. A further 4 sections (not shown in FIG. 7) of the excitation coil 11 connect in a similar way, using the two remaining vias at the centre of the excitation coil 11 and the via to the bottom of the coil, and culminating in a trace connecting to the EB connection on the right of the board 9.

The design presented here yields an excitation coil 11 whose diameter is maximised without clashing with SIN and COS coils 13, to further increase efficiency and hence output EMF. This is made possible by eliminating vias positioned between the sensor coils 13 and the excitation coil 11. Vias used for connecting different sections of the excitation coil 11 are instead positioned within the turns of and between the SIN and COS coils 13, where there is plenty of space, or inside the excitation coil 11, where additional excitation turns have less effect on efficiency.

FIG. 8 illustrates how the excitation coil 11 is implemented using the same physical layers as the SIN and COS coils 13 without clashing. For example, FIG. 8a illustrates layer 1, which comprises half of the COS coil 13-2 and the second and sixth sections of the excitation coil 11. These sections of the excitation coil 11 are designed in such a way that their outer connections occur on layer 1, where they may pass over the SIN coil 13-1 connections on layers 2 and 3 and between the two sets of loops of the COS coil 13-2 on layer 1. In order to connect in this special way, the excitation coil 11 is a two-start spiral, with each arm having 5.25 turns.

The excitation coil 11 can be seen to have substantial symmetry. In particular, its field patterns are highly symmetric under rotations of 90° and 180°, which means that coupling between the excitation coil and SIN and COS coils 13 is minimised. This reduction in stray coupling yields high accuracy, especially when the sensor is operated with excitation current applied continuously.

Figure 9:
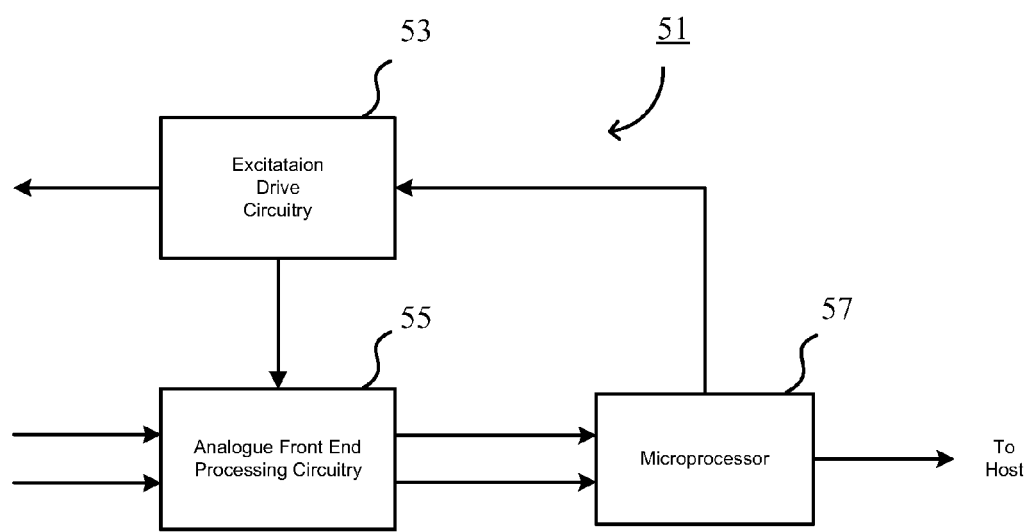
FIG. 9 is a block diagram illustrating the excitation and processing circuitry used to drive the excitation winding and used to process the signals obtained from the sensor windings to determine the position of the rotor.

FIG. 9 schematically illustrates the excitation and processing circuitry 51 used in this embodiment to determine the position of the resonator relative to the sensor windings 13. As shown, the circuitry 51 includes excitation drive circuitry 53 for generating an excitation signal for application to the excitation winding 11 and analogue front end processing circuitry 55 for processing the signals induced in the sensor windings 13. The circuitry 51 also includes a microprocessor 57 for controlling the excitation drive circuitry and for processing the signals received from the analogue front end circuitry to determine the desired position information, which it then outputs, for example to a host device. As those skilled in the art will appreciate, various different ways of driving the excitation winding 11 and of processing the signals obtained from the sensor windings 13 are described in the literature and may be used with the sensing transducer described above. A further description of this circuitry 51 will therefore be omitted.

Modifications and Alternatives

The one period sensor windings 13 illustrated in FIG. 2 have angular accuracy and resolution limited to a certain fraction of its repeat angle, 360°. For greater accuracy and resolution multi-period sensor coils can be used instead of or in addition to the sensor coils 13 discussed above. In order to couple with the resonator 1, the opposing fields from the short and long ends of the resonator 1 should couple with loops wound in opposite senses. This can be achieved by using sensor coils 13 having an odd number of periods in 360°, for example the 3-period windings shown in FIG. 3a of U.S. Pat. No. 6,534,970, the content of which is incorporated herein by reference. Only the one of the windings is schematically shown. A similar winding, except rotated by 30° (one quarter of one third of 360°) could also be provided.

As noted above such a 3-period sensor does not detect angular position unambiguously over 360°. To do this, the sensor coils of FIG. 2 can be combined onto the same sensor board. The electronic circuitry 51 connected to the sensor coils would then combine the unambiguous yet relatively inaccurate data from the one period sensor coils 13 and the accurate yet ambiguous data from the three period sensor coils to yield data which is accurate and unambiguous over 360°.

This approach can be deployed with other sensor coil combinations. For example the data from three period and seven period sensor coils can be combined in the same way to yield data which is accurate and unambiguous over 360°.

The description above is for sensors having two phase (SIN,COS) sinusoidal sensors. The use of a two phase system is not necessary; the invention works with three or more phases.

Figure 10:
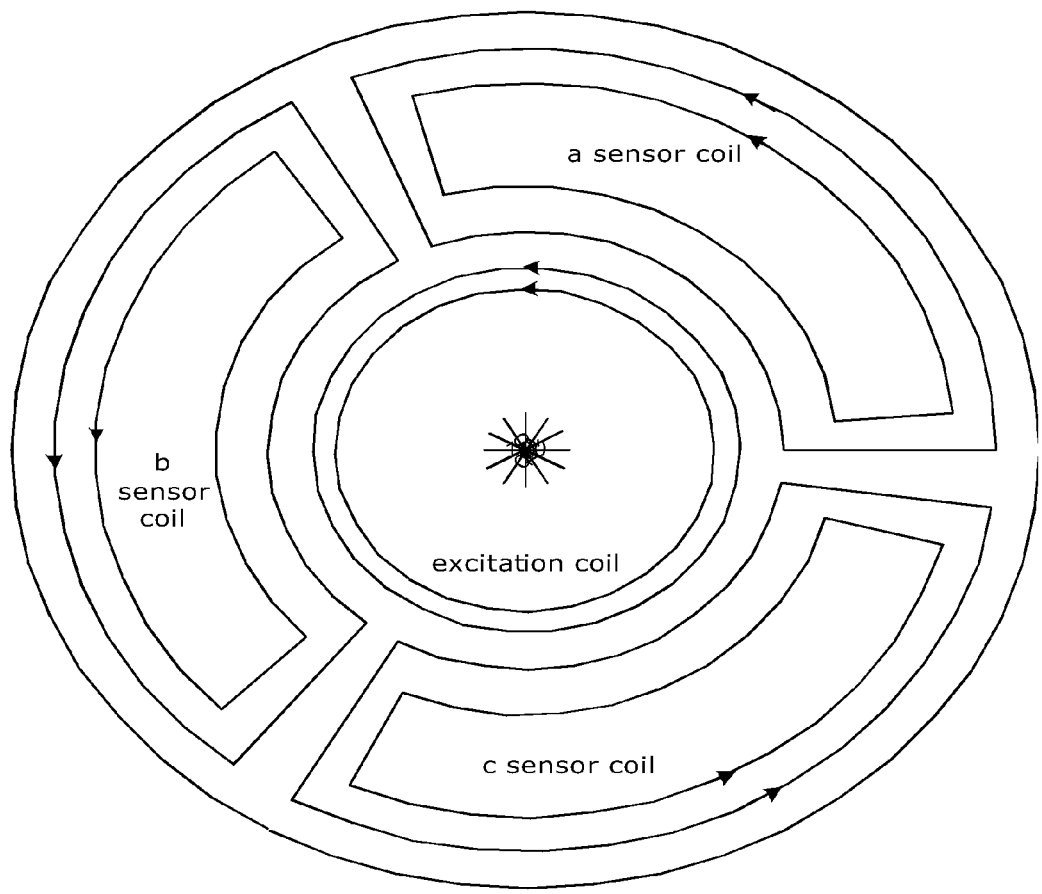
FIG. 10 schematically illustrates an alternative design of sensor winding.

The description above is for sensor coils that are balanced, ie where each coil comprises individual coil segments which are wound in opposite senses. This is not a necessary requirement, as illustrated by the sensor in FIG. 10. Here there are three sensor loops a, b and c, each rotational copies of a simple wound sensor coil. This sensor can be used to detect the position of the resonator of FIG. 1. In such an embodiment, an electronic processor would detect the amplitude of signals induced by the resonator 1 in each loop, respectively Aa, Ab and Ac, and use these to determine the resonator position using an appropriate interpolation algorithm. For example the following may be used:

$$Az\_estimate = a\tan 2[Aa-(Aa+Ab+Ac)/3, (Ab-Ac)/\sqrt{(3)}]$$

Similarly, sensors having a different number of arrayed coils may be used, in conjunction with interpolation routines appropriate to the sensor and resonator geometry.

We noted above that a sensor coil patterned to generate an odd number of sinusoidal repeats over a circle has equal and opposite sensitivities to fields generated at points on opposing sides of its axis, and therefore couples with the resonator of FIG. 1. This approach will not work for a sensor coil pattern having an even number of repeats, since these have equal sensitivity at the same phase for points diametrically opposing. Fields from the short and long ends of the resonator shown in FIG. 1 therefore cancel out when it is placed across the sensor's diameter. Instead, the resonator 1 may be placed slightly off the diameter, such that its short and long ends always coincide with areas where the sensor has equal and opposite field sensitivity.

We described above an excitation coil 11 that is wound within the inner portions of sensor coils 13. The excitation coil may instead overlap sensor coils as illustrated in U.S. Pat. No. 6,522,128, or it may be wound around the sensor's outer portion, or a combination of such positions. The excitation coil 11 may be wound in different senses. For example it may be implemented in two parts, one wound clockwise within the sensor coils and one anticlockwise outside. By appropriately selecting the number of turns in each portion, the fields from the two portions may cancel at some distance and beyond, to minimise emissions that may otherwise cause interference.

We described sensor boards 9 built from conductors printed on circuit boards (PCBs) above. They may instead be built from appropriately patterned windings of wire. They may also optionally be wound onto formers, which may optionally be magnetically permeable formers to concentrate the field to improve signal levels and/or accuracy.

Figure 11:
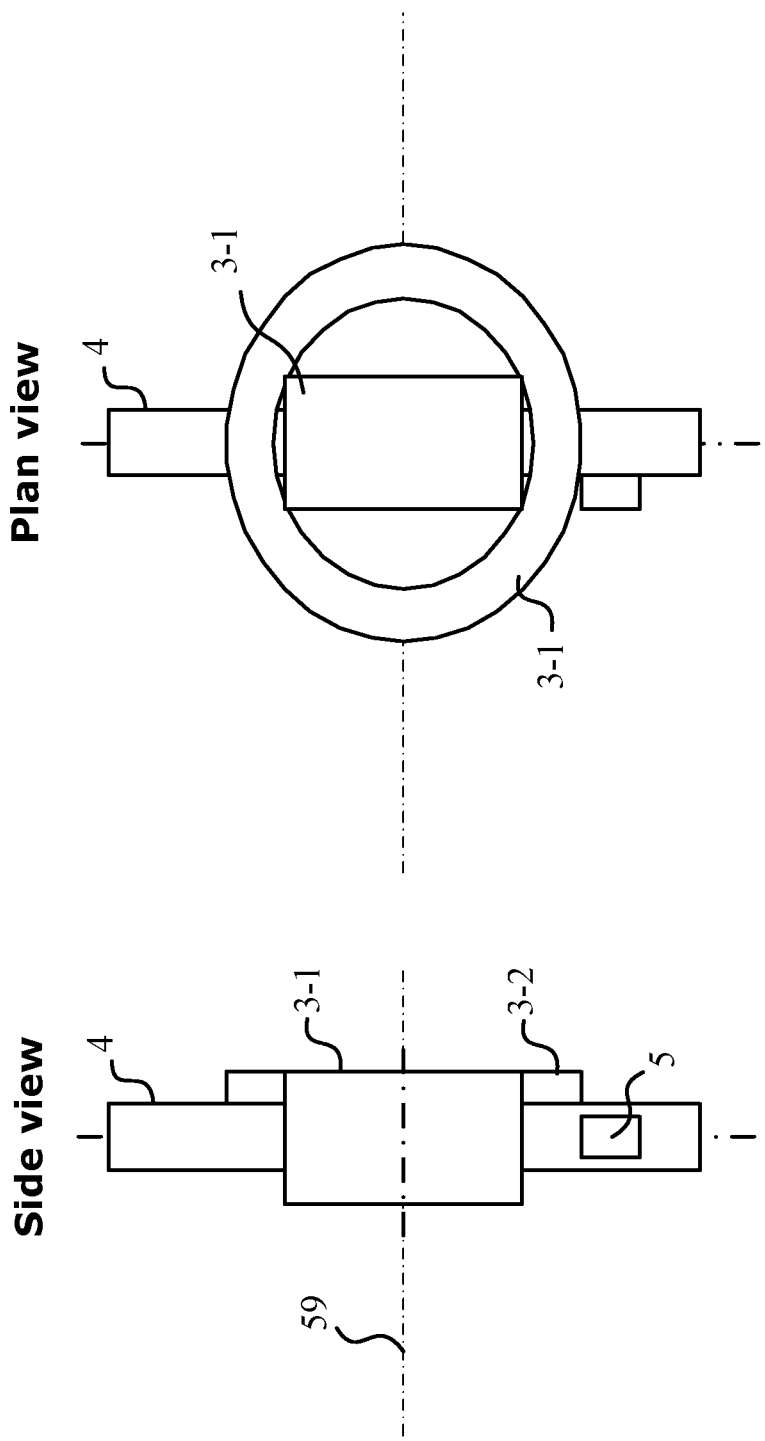
FIG. 11 schematically illustrates an alternative design of resonator having first and second orthogonally mounted coils.

We described a resonator 1 above, having a single offset winding 3 (which may optionally be tilted), to create equal and opposite fields at its two ends in response to an excitation field that is substantially uniform under rotation. This can also be achieved with the resonator of FIG. 11. Here there are two coils 3-1 and 3-2 connected in series, one around the ferrite rod 4 for creating equal and opposite fields at the ferrite rod's ends and one wound around the sense angle axis 59 for relatively uniform coupling with the sensor board's excitation coil 11. The series connected coils 3 are placed in parallel with the capacitor 5 as before, to create a resonant circuit.

Figure 12:
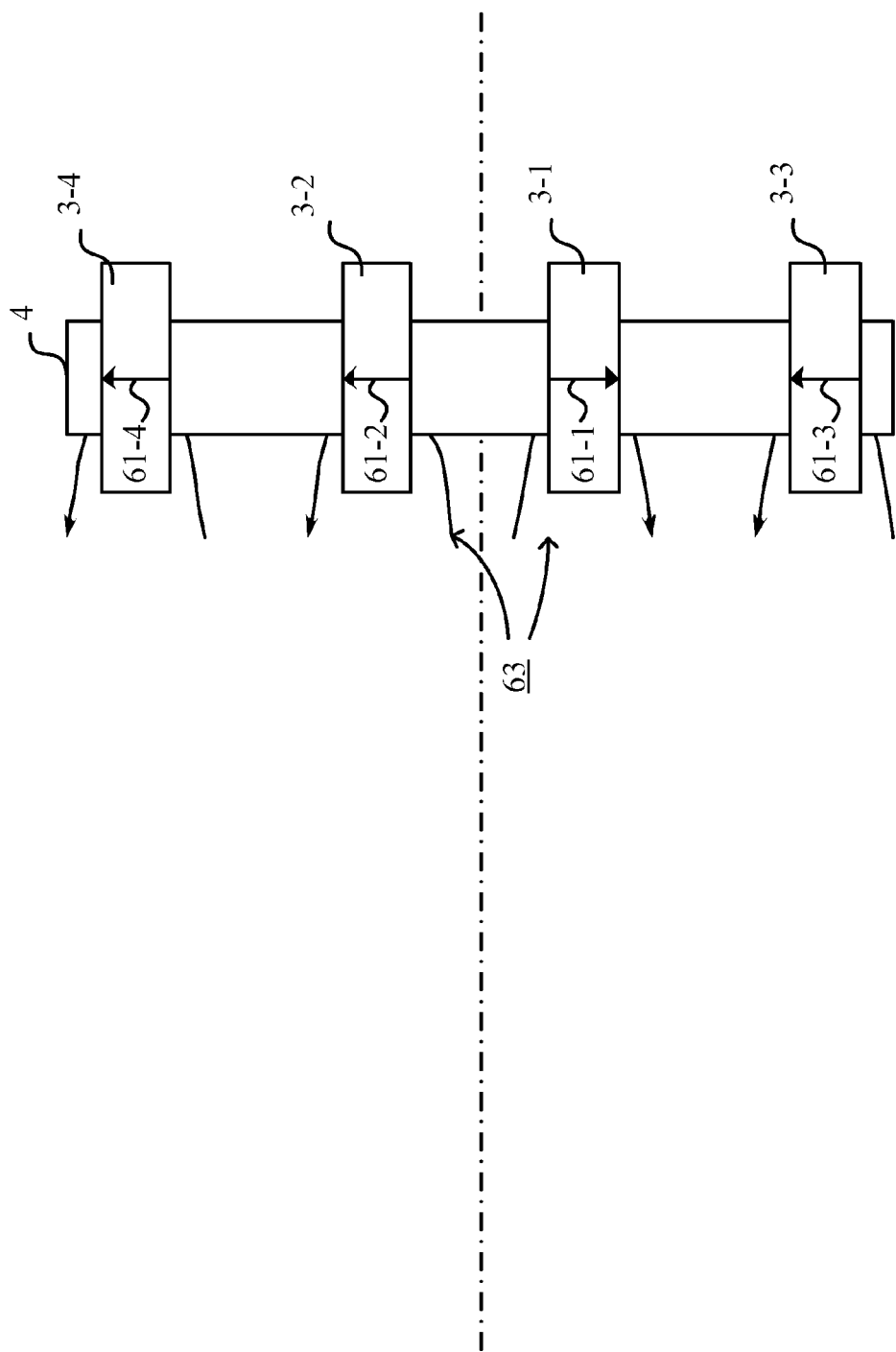
FIG. 12 schematically illustrates an alternative design of resonator having four coaxial coils.

The ferrite rod 4 of FIG. 1 is wound with a single coil 3. It may instead be built using multiple connected coils 3 to achieve its function, for example as illustrated in FIG. 12. In this case the winding directions (represented by the direction of the arrows 61-1 and 61-2) of coils 3-1 and 3-2 towards the centre of the ferrite rod 4 are opposed to couple with excitation field 63, while those at opposite ends (coils 3-3 and 3-4) are in the same direction (represented by arrows 61-3 and 61-4) to create equal and opposite fields at those ends for coupling with sensor coils as before.

Figure 13:
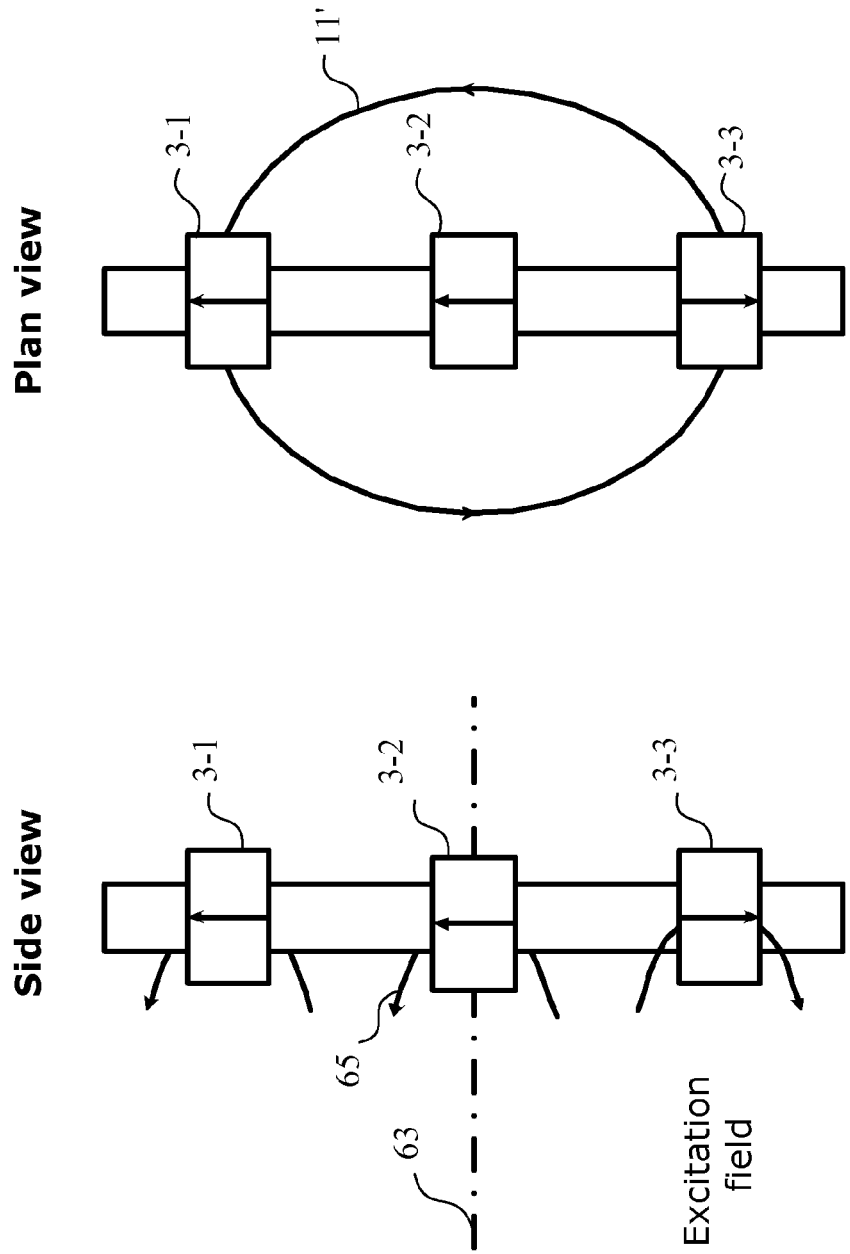
FIG. 13 schematically illustrates an alternative design of resonator having three coaxial coils.

The resonators described above were designed to couple with an excitation field applied near their centres, and to generate equal and opposite fields at their ends in order to couple with sensor coils. These positions can be modified. For example the resonator of FIG. 13 is excited at its ends and still creates equal and opposite fields at points on opposite and equidistant sides of the sense axis 63 in response. In particular, the resonator shown in FIG. 13 includes 3 series connected portions 3-1 to 3-1, with outer portions 3-1 and 3-3 being wound in opposite sense for coupling with an excitation coil 11' mounted outside of sensor coils (not shown). The centre portion 3-2 of the resonator coil 3 is wound in one direction so that this portion of the coil 3 will generate a resonator field 65 that has equal and opposite fields at different points either side of the sense axis 63.

Figure 14:
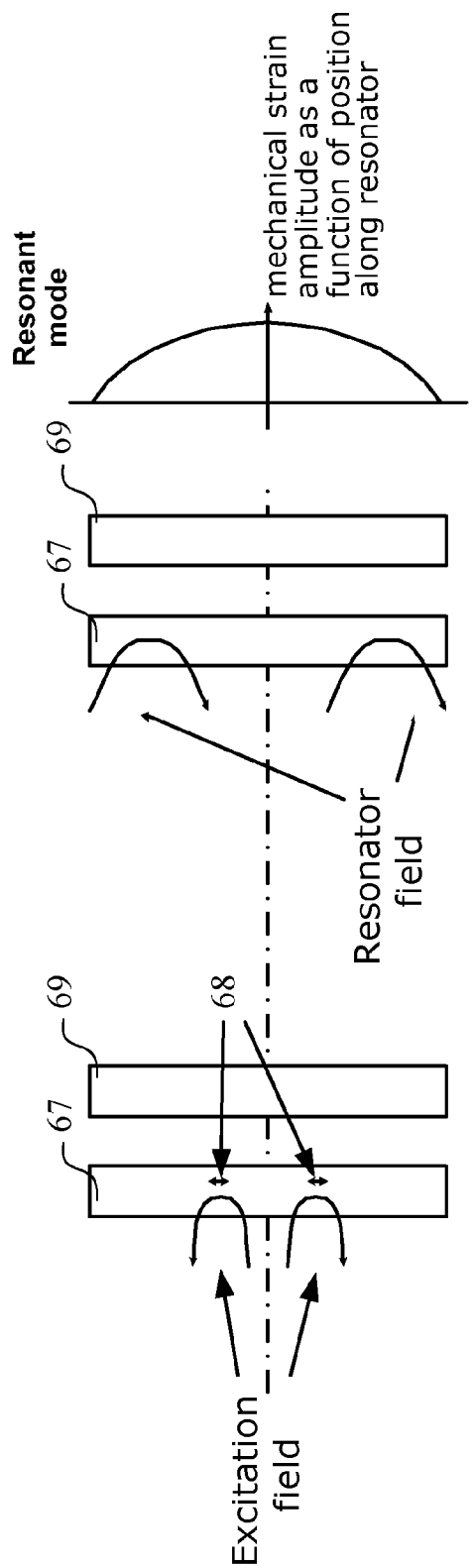
FIG. 14 schematically illustrates an alternative resonator system that uses a magnetostrictive resonator.

We described magnetically coupled resonators above which were implemented with a wound coil in parallel with a capacitor, where energy is exchanged between magnetic (current in a coil) and electrostatic (electric field across capacitor plates) forms. The magnetically coupled resonance may be achieved in different ways. For example, a strip 67 of appropriately biased magnetostrictive material may be mounted to permit mechanical oscillation 68 as illustrated in FIG. 14. An excitation field is concentrated inside the magnetostrictive element 67. A bias element 69 is also provided which interacts with the excitation field to create mechanical strains 68 near the centre of the magnetostrictive element 67. The strains shown are equal in size and the same polarity due to the reversal in the bias field near the centre. They are relatively uniform across rotation of the magnetostrictive element 67 about the sense angle axis represented by the dashed line. The excitation field's frequency is chosen to coincide with an appropriate mechanical resonant mode of the magnetostrictive element 67. The mode shown to the right of FIG. 14 is the fundamental. In combination with bias fields near the ends of the magnetostrictive elements 67, this resonance induces fields at these points which are equal and opposite, as for the resonators of FIGS. 1, 11 and 12.

The resonators described above may be used in conjunction with shielding material on the side opposite to the sensor, to minimise field distortion and interference from objects behind. This shielding may be built from magnetically permeable material and/or from conductive material.

The systems described above sensed position by powering a resonator with an approximately uniform field and detecting the response in two or more patterned sensor coils. However what is fundamental is the measurement of the relative coupling factors from the resonator to the patterned sensor coils. These coupling factors may also be derived from a measurement in the "reverse" direction. In this case current is passed through the patterned coils (eg coils 13 shown in FIG. 2) to power the resonator 1 and detected by a coil with relatively uniform coupling (eg coil 11 shown in FIG. 2). Coupling factors may be established by amplitude measurements taken by powering each patterned coil in turn, or by modulating the excitation amplitude and/or phase driven into each patterned coil such that the combined signal out of the uniform coil may be decoded to separate out the individual coupling components. Patterned coils may also be used for both energising the resonator and for sensing the resonator signal, in a similar manner to the way taught in U.S. Pat. No. 6,489,899, the content of which is incorporated herein by reference.

Figure 15:
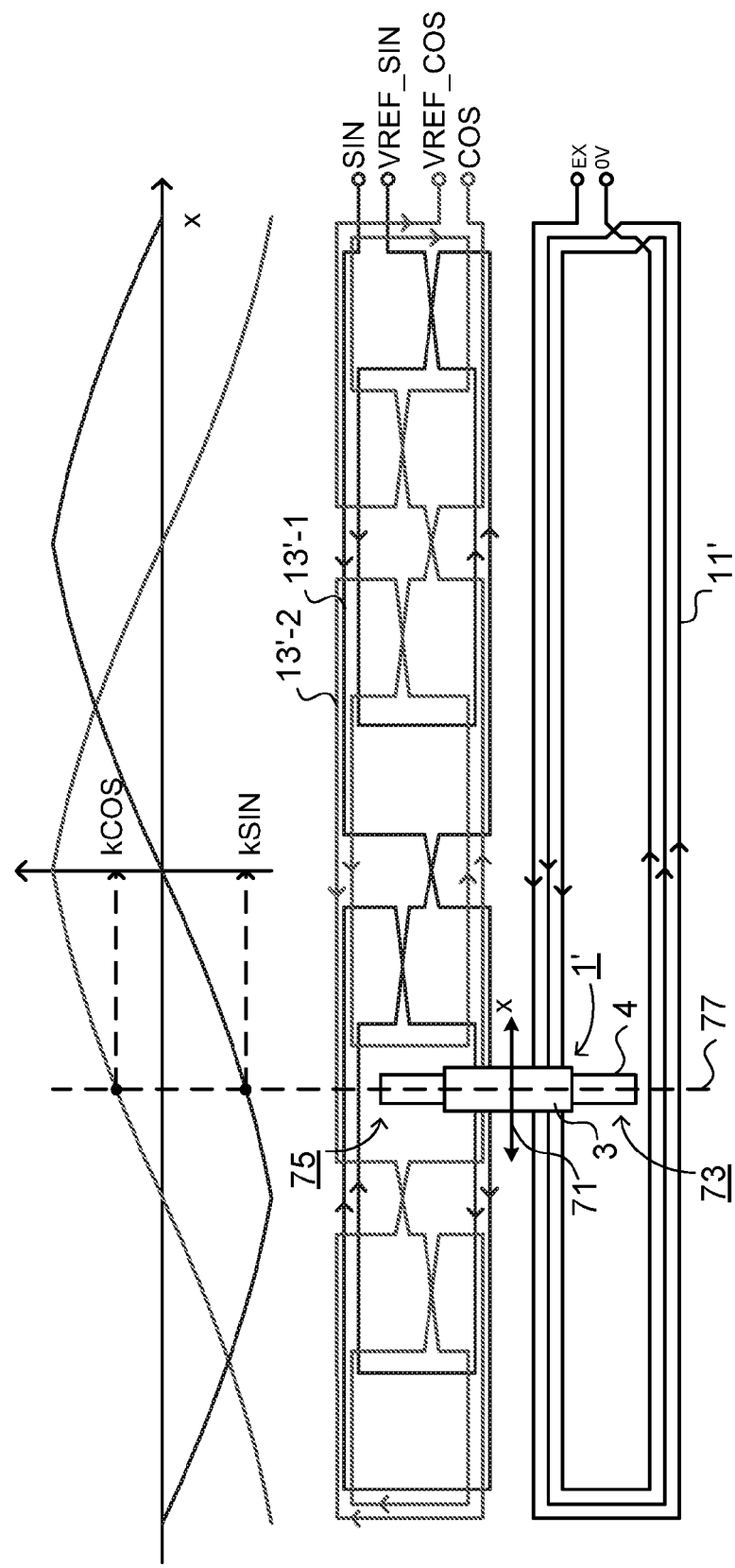
FIG. 15 schematically illustrates a linear embodiment for sensing the position of a resonator element along a linear measurement path.

In the previous embodiments, the resonator has been mounted for rotation relative to the sensor and excitation windings. The invention is also applicable to linear embodiments, such as the one illustrated in FIG. 15. In particular, FIG. 15 shows a resonator 1' which is mounted for movement along the illustrated x-axis, as illustrated by the arrow 71. As shown, in this embodiment, the resonator coil 3 is symmetrically mounted on the ferrite rod 4. the resonator 1' is mounted so that the lower end 73 moves adjacent the excitation winding 11' and the upper end 75 moves adjacent the SIN and COS sensor windings 13'-1 and 13'-2. As shown, in this embodiment, the resonator 1' moves such that its axis 77 is substantially perpendicular to the measurement path.

The operation of this embodiment is similar to the previous embodiments. In particular, when excitation current is applied to the excitation winding 11', excitation magnetic field couples into the lower end 73 of the ferrite core 4, which in turn causes the resonator 1' to resonate. The magnetic field generated by the resonator 1 will emerge from the lower end 73 of the resonator and "flows" to the upper end 18, thereby coupling with the SIN and COS sensor windings 13'. FIG. 14 also illustrates the way in which the amplitudes of the signals induced in the sensor windings 13' vary with the position of the resonator 1' along the x-axis. As before, the amplitudes vary approximately sinusoidally with position.

In an alternative linear embodiment, a second set of sensor windings may be arranged below the excitation winding 11'. In this case, the resonator coil 3 would remain in its current position, but the ferrite rod 4 would be extended so that the lower end 73 was positioned over the second set of sensor windings. The signals from the two sets of sensor windings can then be combined and processed to determine the desired position information. For example, if the additional set of sensor windings are exact copies of the windings illustrated in FIG. 15, then the signals from the two SIN windings can be subtracted and the signals from the two COS windings can be subtracted to leave signals that vary in the desired manner. The subtraction can be performed in the processing electronics or by connecting the two SIN windings in series and the two COS windings in series. As the resonator field will couple into the lower set of sensor windings with opposite polarity to that of the upper set of windings, this subtraction will result in the addition of the desired positionally varying signals, whilst removing any common interference. Additionally, this arrangement will provide the sensor with some immunity to variations of reported position due to slight rotation of the resonator 1' about an axis orthogonal to the page. This is because any such rotation will result in equal and opposite position shifts in the sensor signals that are combined and therefore, these shifts will approximately cancel each other out. In such an embodiment, of course, the second set of sensor windings do not need to be identical to the first set of sensor windings. The second set of windings may, for example, have different periodicities so that the two sets of signals can be combined to overcome the ambiguity problem associated with windings that repeat.

What is claimed is:

1. A transducer for use in a position sensor, the transducer comprising:
   a resonator having an elongate magnetic field concentrating member and a resonator coil wound around the magnetic field concentrating member;
   a first coil operable, in use, to couple more strongly with a first portion of the magnetic field concentrating member positioned adjacent the first coil than with a second portion of the magnetic field concentrating member; and
   a second coil operable, in use, to couple more strongly with the second portion of the magnetic field concentrating member positioned adjacent the second coil than with the first portion of the magnetic field concentrating member, the second portion being spaced along the magnetic field concentrating member from the first portion;
   wherein the resonator is electrically separate from said first and second coils, and the resonator coil is wound around a third portion of said magnetic field concentrating member which third portion is located between said first and second portions;
   wherein one of the first and second coils is for exciting the resonator and the other one of the first and second coils is for sensing a signal generated by the resonator when excited;
   wherein, during use, the resonator and at least one of the first and second coils are relatively moveable along a measurement path that is different from a longitudinal axis of the elongate magnetic field concentrating member;
   wherein said at least one of the first and second coils extends along the measurement path and is patterned so that electromagnetic coupling between the resonator and said at least one of the first and second coils varies as a function of the relative position between the resonator and said at least one of the first and second coils along the measurement path.

2. A transducer according to claim 1, wherein the electromagnetic coupling between said resonator and the first coil varies as a function of the relative position between the resonator and the first coil.

3. A transducer according to claim 1, wherein the electromagnetic coupling between said resonator and the second coil varies as a function of the relative position between the resonator and the second coil.

4. A transducer according to claim 1, comprising a third coil operable, in use, to couple with a fourth portion of the magnetic field concentrating member positioned adjacent the third coil, the first portion being positioned between said second and fourth portions.

5. A transducer according to claim 4, wherein said second and third coils are connected in series.

6. A transducer according to claim 5, wherein said second and third coils are connected in series so that signals induced in the second coil by a background magnetic field oppose the signals induced in the third coil by the same background magnetic field.

7. A transducer according to claim 5, wherein, during use, an electromagnetic field generated by said resonator couples with a first polarity with said second coil and couples with a second, opposite, polarity with said third coil.

8. A transducer according to claim 4, wherein said resonator coil is mounted asymmetrically on said field concentrating member.

9. A transducer according to claim 1, for use in a rotary position sensor and wherein the resonator is rotatable about an axis which passes through or near said first portion and which is transverse to the longitudinal axis of the magnetic field concentrating member.

10. A transducer according to claim 9, comprising a third coil operable, in use, to couple with a fourth portion of the elongate magnetic field concentrating member positioned adjacent the third coil, the first portion being positioned between said second and fourth portions and wherein said second and third coils are symmetrically arranged about an axis and wherein said rotation axis is substantially coaxial with said axis of symmetry.

11. A transducer according to claim 1, wherein said first portion is located approximately midway along the length of the magnetic field concentrating member and wherein the second portion is located approximately at one end of the field concentrating member.

12. A transducer according to claim 1, wherein said first and second coils are substantially planar and wherein the magnetic field concentrating member is oriented so that said longitudinal axis of the magnetic field concentrating member lies in a plane that is substantially parallel with said planar coils.

13. A transducer according to claim 1, wherein said first and second coils are formed from conductor tracks on a printed circuit board or conductive inks on a substrate.

14. A transducer according to claim 1, wherein said first coil is for exciting the resonator and the second coil is for sensing a signal generated by the resonator when excited.

15. A transducer according to claim 1, wherein said second coil is for exciting the resonator and the first coil is for sensing a signal generated by the resonator when excited.

16. A transducer according to claim 1, wherein coupling between the resonator and the first and/or second coil varies with position in a direction that is substantially orthogonal to said longitudinal axis of the magnetic field concentrating member.

17. A transducer according to claim 1, wherein said measurement path extends in a direction that is substantially perpendicular to said longitudinal axis of the magnetic field concentrating member.

18. A transducer according to claim 1, wherein said at least one of the first and second coils is patterned so that the electromagnetic coupling between the resonator and said at least one of the first and second coils varies substantially sinusoidally with the relative position between the resonator and said at least one of the first and second coils.

19. A position sensor for sensing the relative position of first and second relatively moveable members, the position sensor comprising a transducer for use in a position sensor, the transducer comprising:

a resonator having an elongate magnetic field concentrating member and a resonator coil wound around the magnetic field concentrating member;

a first coil operable, in use, to couple more strongly with a first portion of the magnetic field concentrating member positioned adjacent the first coil than with a second portion of the magnetic field concentrating member; and a second coil operable, in use, to couple more strongly with the second portion of the magnetic field concentrating member positioned adjacent the second coil than with the first portion of the magnetic field concentrating member, the second portion being spaced along the magnetic field concentrating member from the first portion;

wherein the resonator is electrically separate from said first and second coils, and the resonator coil is wound around a third portion of said magnetic field concentrating member which third portion is located between said first and second portions;

wherein one of the first and second coils is for exciting the resonator and the other one of the first and second coils is for sensing a signal generated by the resonator when excited;

wherein, during use, the resonator and at least one of the first and second coils are relatively moveable along a measurement path that is different from a longitudinal axis of the elongate magnetic field concentrating member; wherein said at least one of the first and second coils extends along the measurement path and is patterned so that electromagnetic coupling between the resonator and at least one of the first and second coils varies as a function of the relative position between the resonator and said at least one of the first and second coils along the measurement path;

and excitation and processing circuitry for exciting one of the first and second coils and for processing the signal obtained in the other one of the first and second coils to determine the relative position of said relatively moveable members.

20. A transducer according to claim 17, wherein said first and second coils are substantially planar and wherein the magnetic field concentrating member is oriented so that said longitudinal axis of the magnetic field concentrating member lies in a plane that is substantially parallel with said planar coils.

* * * * *

UNITED STATES PATENT AND TRADEMARK OFFICE
CERTIFICATE OF CORRECTION

PATENT NO. : 8,570,028 B2  
APPLICATION NO. : 12/599287  
DATED : October 29, 2013  
INVENTOR(S) : David Thomas Eliot Ely It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Twenty-second Day of September, 2015

Michelle K. Lee
*Director of the United States Patent and Trademark Office*